US011487018B2

(12) United States Patent
Fowe et al.

(10) Patent No.: US 11,487,018 B2
(45) Date of Patent: Nov. 1, 2022

(54) ALGORITHM AND ARCHITECTURE FOR MAP-MATCHING STREAMING PROBE DATA

(71) Applicant: HERE Global B.V., Eindhoven (NL)

(72) Inventors: James Fowe, Chicago, IL (US); Bruce Bernhardt, Chicago, IL (US); Filippo Pellolio, Sunnyvale, CA (US)

(73) Assignee: HERE Global B.V., Eindhoven (NL)

( * ) Notice: Subject to any disclaimer, the term of this patent is extended or adjusted under 35 U.S.C. 154(b) by 86 days.

(21) Appl. No.: 17/093,015

(22) Filed: Nov. 9, 2020

(65) Prior Publication Data

US 2021/0055424 A1 Feb. 25, 2021

Related U.S. Application Data

(63) Continuation of application No. 15/976,253, filed on May 10, 2018, now Pat. No. 10,852,443.

(51) Int. Cl.
*G01S 19/26* (2010.01)
*G01S 19/06* (2010.01)
(Continued)

(52) U.S. Cl.
CPC .............. *G01S 19/26* (2013.01); *G01S 19/06* (2013.01); *G01S 19/07* (2013.01); *G01S 19/23* (2013.01)

(58) Field of Classification Search
CPC ........... G01S 19/26; G01S 19/06; G01S 19/07
(Continued)

(56) References Cited

U.S. PATENT DOCUMENTS

2011/0313648 A1 12/2011 Newson
2015/0045072 A1* 2/2015 Chao .................... G01C 21/206 455/456.6

(Continued)

FOREIGN PATENT DOCUMENTS

CA 3063705 A1 * 11/2018 ............ B60W 40/10
CN 206696702 U * 12/2017

(Continued)

OTHER PUBLICATIONS

Ahres, Y., et al. "Real-Time Dense Map Matching with Naive Hidden Markov Models: Delay versus Accuracy." Stanford University, Dec. 2014.

(Continued)

*Primary Examiner* — Harry K Liu
(74) *Attorney, Agent, or Firm* — Lempia Summerfield Katz LLC

(57) ABSTRACT

An apparatus for matching probe measurements to a path in a geographic location includes a receiver, a window manager, a location generator, a path calculator, and an output. The receiver is configured to receive a stream of probe measurements. The window manager is configured to fill a window with the measurements, to select an additional measurement from the stream, and to select an oldest measurement in the window. The location generator is configured to generate candidate locations for the measurements in the window and the additional measurement. The path calculator is configured to match the oldest measurement to a candidate location. The output is configured to output a path-matched probe measurement based on the oldest measurement and the candidate location matched to the oldest measurement.

20 Claims, 13 Drawing Sheets

MAP-MATCHING CONTROLLER 121
SERVER 125
123
NETWORK 127
PROBE 101
MOBILE DEVICE 122
VEHICLE 124
PROBE 101
MOBILE DEVICE 122
VEHICLE 124

(51) Int. Cl.
*G01S 19/07* (2010.01)
*G01S 19/23* (2010.01)

(58) Field of Classification Search
USPC .............................................. 342/352, 357.3
See application file for complete search history.

(56) References Cited

U.S. PATENT DOCUMENTS

| | | | |
|---|---|---|---|
| 2017/0074659 | A1 | 3/2017 | Giurgiu |
| 2018/0172468 | A1 | 6/2018 | Sagall |
| 2018/0228004 | A1 | 8/2018 | Masuda |
| 2019/0180523 | A1 | 6/2019 | Unno |

FOREIGN PATENT DOCUMENTS

| | | | | | |
|---|---|---|---|---|---|
| CN | 106197428 | B | * | 3/2019 | ............. G01C 21/20 |
| EP | 3030861 | B1 | * | 11/2017 | ........... G01C 21/206 |
| WO | WO-2015163727 | A1 | * | 10/2015 | ............. G01C 21/32 |
| WO | 2016068807 | A1 | | 5/2016 | |

OTHER PUBLICATIONS

European Search Report for European Patent Application No. 19173378.1-1003 dated Oct. 18, 2019.

Goh, Chong Yang, et al. "Online map-matching based on hidden markov model for real-time traffic sensing applications." Intelligent Transportation Systems (ITSC), 2012 15th International IEEE Conference on. IEEE, 2012.

Hunter, Timothy, Pieter Abbeel, and Alexandre M. Bayen."The path inference filter: model-based low-latency map matching of probe vehicle data." Algorithmic Foundations of Robotics X. Springer Beriin Heidelberg, 2013. 591-607.

Imamichi, Takashi, Takayuki Osogami, and Rudy Raymond. "Truncating Shortest Path Search for Efficient Map-Matching." IJCAI. 2016.

Jagadeesh, George Rosario, and Thambipillai Srikanthan. "Probabilistic Map Matching of Sparse and Noisy Smartphone Location Data." 2015 IEEE 18th International Conference on Intelligent Transportation Systems. IEEE, Sep. 15, 2015. (pp. 812-817).

Mozes, Shay, Oren Weimann, and Michal Ziv-Ukelson. "Speeding up HMM decoding and training by exploiting sequence repetitions." Annual Symposium on Combinatorial Pattern Matching. Springer, Berlin, Heidelberg, 2007.

Viterbi Algorithm, (https://en.wikipedia.org/wiki/Viterbi_algorithm) date accessed: Apr. 4, 2018.

Wang, Guanfeng, and Roger Zimmermann. "Eddy: an error-bounded delay-bounded real-time map matching algorithm using HMM and online Viterbi decoder." Proceedings of the 22nd ACM SIGSPATIAL International Conference on Advances in Geographic Information Systems. ACM, 2014.

* cited by examiner

ALGORITHM AND ARCHITECTURE FOR MAP-MATCHING STREAMING PROBE DATA

CROSS-REFERENCE TO RELATED APPLICATIONS

This application is a continuation of U.S. patent application Ser. No. 15/976,253 entitled "ALGORITHM AND ARCHITECTURE FOR MAP-MATCHING STREAMING PROBE DATA," filed on May 10, 2018, the entire disclosure of which is hereby incorporated by reference.

FIELD

The following disclosure relates to processing of Global Positioning System (GPS) or global navigation satellite system (GNSS) probe measurements for matching with map data.

BACKGROUND

Map databases include a network of road links or road segments that connect nodes. Map databases may be used to provide navigation-based features, such as routing instructions for an optimum route from an original location to a destination location, and map-based features, such as sectioning and displaying maps to manually locate locations or points of interest. Map databases are used in driver assistance systems such as autonomous driving systems.

One classic and fundamental step in probe processing for providing navigation-based features is map matching. Map matching is a technique for matching a raw GNSS probe location to the nearest and most probable road segment or link. There are many map-matching algorithms in existence with trade-offs in computational complexity versus accuracy.

SUMMARY

In one embodiment, a method of matching probe measurements to a path in a geographic location includes receiving one or more measurements from a probe for a window, receiving an additional measurement from the probe, determining at least one candidate location for the one or more measurements in the window and for the additional measurement, selecting an oldest measurement from the one or more measurements in the window, determining a probability that a candidate location corresponds to a measurement for the candidate locations of the one or more measurements in the window and the additional measurement, removing candidate locations based on a threshold probability, matching the oldest measurement to a candidate location of the at least one candidate location for the oldest measurement based on the at least one candidate location of the one or more measurements in the window and the at least one candidate location of the additional measurement, and outputting a path-matched probe measurement based on the candidate location matched to the oldest measurement.

In another embodiment, an apparatus for matching probe measurements to a path in a geographic location includes at least a receiver, a, window manager, a location generator, a path calculator, and an output. The receiver is configured to receive a stream of measurements from the probe. The window manager is configured to fill a window with one or more measurements from the stream of measurements, to select an additional measurement from the probe, and to select an oldest measurement from the one or more measurements in the window. The location generator is configured to determine at least one candidate location for the measurements in the window and for the additional measurement. The path calculator is configured to match the oldest measurement to a candidate location of the at least one candidate location for the oldest measurement based on the at least one candidate location of the one or more measurements in the window and the at least one candidate location of the additional measurement. The output is configured to output a path-matched probe measurement based on the candidate location matched to the oldest measurement.

In another embodiment, a non-transitory computer-readable medium includes instructions to receive a plurality of measurements from the probe to fill a window, receive an additional measurement from the probe, determine at least one candidate location for measurements in the plurality of measurements in the window and for the additional measurement, select an oldest measurement from the plurality of measurements in the window, match the oldest measurement to a candidate location of the at least one candidate location for the oldest measurement based on the at least one candidate location of the plurality of measurements in the window and the at least one candidate location of the additional measurement, and output a path-matched probe measurement based on the candidate location matched to the oldest measurement.

BRIEF DESCRIPTION OF THE DRAWINGS

Exemplary embodiments of the present invention are described herein with reference to the following drawings.

DETAILED DESCRIPTION

Figure 1:
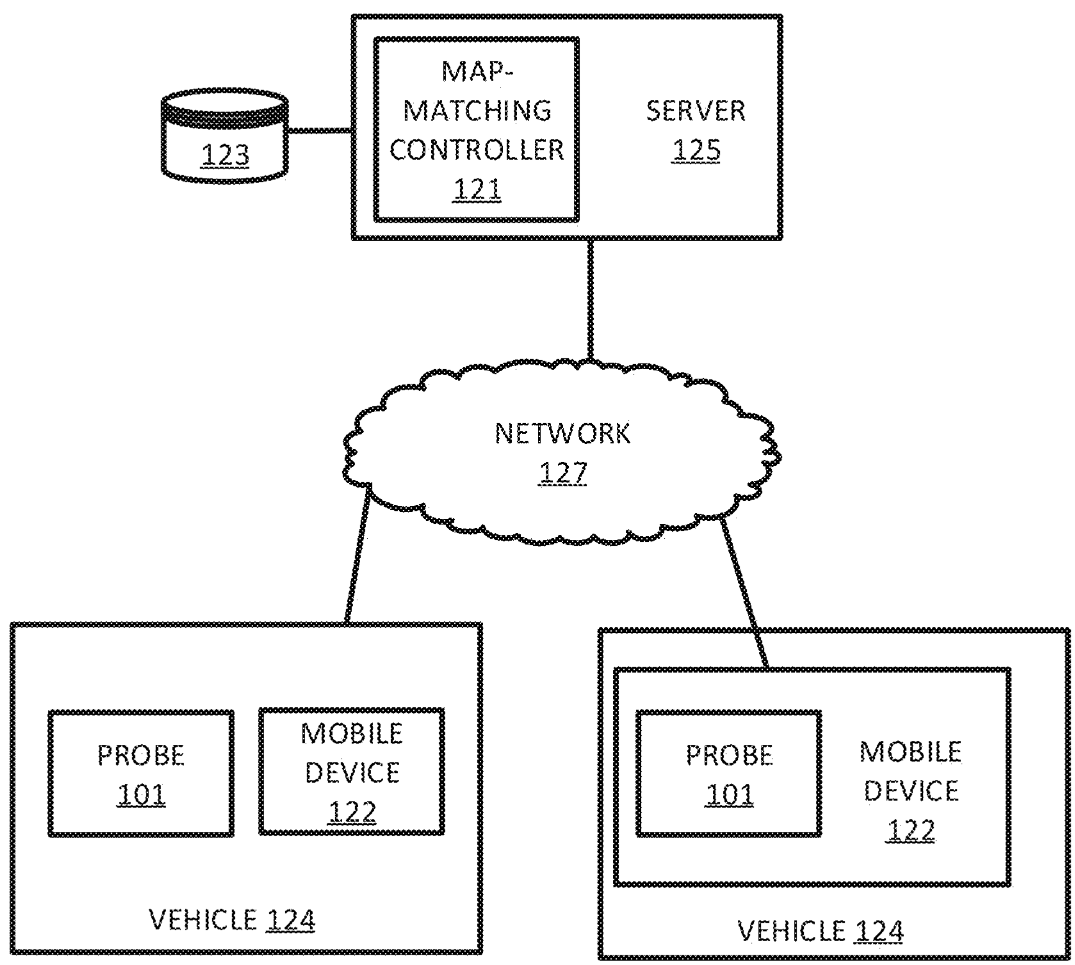
FIG. 1 illustrates an example system for map-matching streaming probe data.

Map-matching is the process of matching a measurement taken by a GNSS probe to a location on a map. Because of the uncertainty in a GNSS measurement, the reported location of the probe may not be the actual location of the probe. For example, the probe may be traveling on a highway, but due to the uncertainty of the GNSS measurement, the measured location may place the probe on an access road adjacent to the highway. When building and maintaining geographic databases or providing location-based services, inaccurate probe measurements may result in inaccuracies in the databases or services. For example, where a probe is traveling at a low rate of speed on an access road adjacent to a highway, and the probe inaccurately measures a location as being on the highway, a geographic database using the probe data may store the low rate of speed of the probe as happening on the highway. The result is that location-based service using the geographic database may inaccurately report slow moving traffic on the highway. Map-matching increases the accuracy of information available to geographic databases and location-based services by matching a reported or measured location of a probe to a nearest and most-probable accurate location, reducing any error due to the uncertainty of GNSS probe measurements.

Algorithms based on the hidden markov model (HMM) are one approach to map-matching. The HMM is a statistical model describing the relation between an observation (e.g. a GNSS probe measurement) and a hidden state (e.g. a candidate location of the probe where the measurement was actually taken), so called because while the output observation is known, the state of the probe when the observation was recorded is unknown, or 'hidden.' Most of the previous HMM approaches to map-matching have the downside of high computational cost because the transition probabilities between the hidden markov states are obtained by running the A* search algorithm for least cost path computation between the hidden markov states, which is computationally expensive. Because of these computational constraints, traffic service providers (TSPs) have difficulty deploying a HMM-based map-matcher in real-time map information processing systems. Instead, many TSPs deploy a point-based map-matcher due to reduced computational cost despite the lower accuracy of a point-based map matcher.

These considerations are also true for the classical batch approach to map-matching, but that approach has two major flaws: it is a batch algorithm, and it is too slow to run on the huge number of probe locations received by a globally-scaled, real-time traffic engine for a TSP. For example, the Viterbi algorithm can be applied to batch map-matching.

The classical batch map-matching approach is to solve the HMM where the hidden states are generated using any regular point-based map-matcher. For a probe recording GNSS measurements on a trip (e.g. for a GPS sensor traveling in a vehicle), one problem with this approach is that all the measurements from the trip are needed to infer the most probable state for the first probe. In a situation where the trip could last two hours, this solution is not adapted for a real-time traffic engine.

Another algorithm for path-based map-matching of real-time (e.g. streaming) probe measurements is called the sliding window map-matcher (SWMM). The concept of a sliding window may be used for map-matching because the stream of measurements is generated by the same probe on a trip. Additionally, the SWMM retains information about the probability of matching the probe measurements in the window to paths as the window slides through the stream of measurements, thereby reducing the computational burden of matching further measurements in the stream because, in some cases, probability calculation is performed on just the newly received measurements in the stream. Further, the SWMM may increase performance by limiting the number of candidate locations or paths that may be matched to a probe measurement. Because of the sliding window, probability retention, and heuristics that reduce the number of candidate locations that could be matched to a point, SWMM is robust to outliers, more accurate than point based solutions, and has a lower cost than traditional HMM or batch-based solutions. The result is that the SWMM approach is computationally efficient, enabling deployment for TSPs operating on a global scale.

There are three problems that SWMM addresses for traffic processing: (1) computational efficiency, (2) outlier filtering, and (3) smart path processing for stacked bridges and tunnels.

The computational cost of implementing path-based map-matching algorithms consumes a significant portion of a real-time traffic processing engines budget. The significance of the SWMM algorithm is that it is able to implement a HMM path-based solution with linear computational complexity instead of the traditional solutions which execute with quadratic complexity. This cost reduction makes it capable of deployment for real-time processing on a global scale.

Outlier filtering is used where a GNSS probe generates outlier data (e.g. measurements or indicated locations) that are very far off from the actual position of the probe on the path, especially on arterial roads where there is a density of pedestrian probe data, bikes, parked cars, or truck stops. This source of error can cause incorrect map-matching and reduce accuracy of geographic databases and location-based services.

The SWMM is immune to many of these outliers because it tracks previous states of the device supplying the probe data. This continuity helps SWMM to have a probability estimate of knowing which roads and speed the probe previously was observed and the ability to eliminate probe observations that do not look like a moving car, for example, by using metrics like maximum speed or sinuosity of the trajectory.

Stacked roadways, for example, stacked bridges and tunnels, present another source of error in map-matching. Traffic reporting on stacked bridges is a challenge because the GNSS probes have greater uncertainties in the z-level (vertical distance), typically exceeding 8 meters without input from an additional sensor. The greater vertical uncertainty increases the difficulty of determining whether a vehicle is on the top or bottom road. The SWMM solution uses the structure of the road network (e.g. nodes and links between nodes in the network) to infer which road a probe is on, based on past states (e.g. whether the vehicle was matched to the upstream link for the bottom or top road) and future states (e.g. where will the vehicle exit the bridge). This is not possible with a pure point-based approach which considers a singular probe measurement at a time. For example, a point-based map-matcher matching a probe measurement to a path on a stacked bridge may vary between matching measurements to the top and bottom deck because of the vertical uncertainty because it does not account for the path or ramp the probe used to access the bridge. Or, with an equal score in the lateral dimensions, just return the first road in the list of possible roads as no better solution would be found. In this situation, if the first node was the incorrect node, the error would be propagated through the rest of the algorithms.

The following embodiments relate to several technological fields including but not limited to navigation, autonomous driving, assisted driving, traffic applications, and other location-based systems. The following embodiments achieve advantages in each of these technologies because probe measurements can be matched quickly and accurately with locations in a geographic area. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in map-matching.

Navigation applications use map-matching to plot a course for a probe or vehicle and to validate that the vehicle remains on the correct route. Errors in map-matching that result in misidentification of the actual location of a vehicle can result in inaccurate navigation instructions. For example, if a map-matching error results in a probe appearing on a highway instead of an access road, navigation instructions based on the erroneous match may instruct a vehicle to follow a path that the vehicle cannot access. In this way, accurate map-matching ensures that navigation instructions are accurate and usable.

Autonomous driving uses map-matching to aid in navigation by reinforcing other sensors on an autonomous vehicle. For example, where a camera on an autonomous vehicle sees a road sign, an accurate location generated by map-matching is needed to determine whether or not the autonomous vehicle needs to navigate based on the road sign. An inaccurate location based on a map-matching error could result in mis-navigation of the autonomous vehicle. In this way, accurate-map matching results in accurate navigation of autonomous vehicles and reinforces other sensory systems on the vehicle.

Assisted driving uses map-matching to place the vehicle on a map. For example, a visual representation of the road may be displayed by an assisted driving system to aid a driver. Accurate map-matching ensures that the displayed map representation matches what the driver sees from his viewpoint. Errors in map-matching may result in an errant representation of the roadway, and a driver may ignore or disable the assisted driving system as a result. Accurate map-matching ensures that assisted driving systems effectively aid drivers.

Traffic applications use map-matching to collect, monitor, and report traffic levels. For example, map-matching may be used to match the speed of a probe to a particular roadway. Accurate map-matching ensures that traffic recordings, predictions, and alerts provided by the traffic application are accurate. For example, if an error in map-matching results in a probe traveling at a low rate of speed being matched to a highway instead of an access road (e.g. the actual location of the probe), the traffic application may incorrectly report that traffic on the highway is moving slowly. This can further result in autonomous vehicles or navigation applications avoiding a section of the highway, causing sub-optimal navigation.

FIG. 1 illustrates an example system for map-matching of probe measurements. Probes may collect measurements (e.g. of geographic location and heading) and the probe measurements are matched to a map to provide location-based services. The following embodiments provide a sliding window map-matcher capable of processing a stream of probe measurements in real time to generate map-matched probe-measurements used for providing location-based services.

The map-matching system may improve upon other map-matching approaches by using a sliding window to generate map-matched probe measurements as the probe generates measurements as the probe travels on a trip, instead of waiting for the trip to be complete and all the measurements collected before map-matching. Because the sliding window allows for generation of map-matched probe measurements as the measurements are received, the map-matching system may be implemented in a real-time system. The map-matching system may further improve upon other map-matching approaches by reducing the number of candidate locations that a probe measurement may be matched to. By reducing the amount of candidate locations, the computational complexity of map-matching overall is reduced by reducing the complexity of generating transition probabilities between the candidate locations. By removing candidate locations that are less likely to be matched to the probe measurement, computational complexity is reduced without significantly reducing the accuracy of the map-matching system. For example, the candidate locations may be removed in order from lowest probability to highest probability of matching with a measurement. This ranked order for probability may exhibit a natural clustering where a set of roads may have a near equal probability and then a subsequent grouping may have a more distant probability.

In FIG. 1, one or more vehicles 124 are connected to the server 125 though the network 127. The vehicles 124 may be directly connected to the server 125 or through an associated mobile device 122. A map-matching controller 121, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 124 may be standalone devices such as smartphones or devices integrated with vehicles. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as Wi-Fi or IEEE 802.11, the family of protocols known as Bluetooth, or another protocol) and comparing the signals to a pre-stored pattern of signals (e.g., a radio map). The mobile device 122 may act as probe 101 for determining the position or the mobile device 122 and the probe 101 may be separate devices.

The probe data may describe a geographic location, for example with a longitude value and a latitude value. In addition, the probe data may include a height or altitude. Additionally or alternatively, the probe data may include a heading. The probe data may be collected over time and include timestamps. In some examples, the probe data is collected at a predetermined time interval (e.g., every second, every 100 milliseconds, or another interval). In some examples, the probe data is collected in response to movement by the probe 101 (e.g., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The mobile device 122 may use the probe data for local applications. For example, a map application may provide a map to the user of the mobile device 122 based on the current location. In another example, the mobile device 122 may use the probe data for a navigation application or a traffic application. The navigation application may use the probe data to provide a navigation path for the mobile device. For example, the path may be a path suitable for a pedestrian, drone, boat, bike, a vehicle, or a handicapped user. The traffic application may provide information about traffic levels on paths. In some cases, the traffic application provides real-time traffic levels or traffic estimates based on the probe data. The navigation application may use the probe data to plan a navigation route that is the quickest based on the traffic. For example, where the traffic application indicates that there is a high amount of traffic on a road segment, the navigation application may provide a navigation path that avoids the high-traffic road segment. A social media application may provide targeted content based on the current location. A game application may provide a setting or objects within the game in response to the current location.

The mobile device 122 may transmit the probe data to the server 125 so that the server 125 may provide a service to the mobile device according to the probe data. For example, the mobile device 122 may send probe data to the server 125 and the server 125 may return a location-based service to the mobile device 122, such as a traffic level near the mobile device 122. In some cases, the mobile device 122 matches the probe data to a location and sends the matched probe data to the server 125 to provide location-based service. In some other cases, the mobile device 122 sends the probe data to the server 125 and the server 125 matches the probe data to the location to provide location-based service.

Communication between the vehicles 124 and/or between the mobile device 122 and the server 125 through the network 127 may use a variety of types of wireless networks. Example wireless networks include cellular networks, the family of protocols known as Wi-Fi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long-term evolution (LTE) standards, 5G, DSRC (dedicated short range communication), or another protocol.

Figure 2:
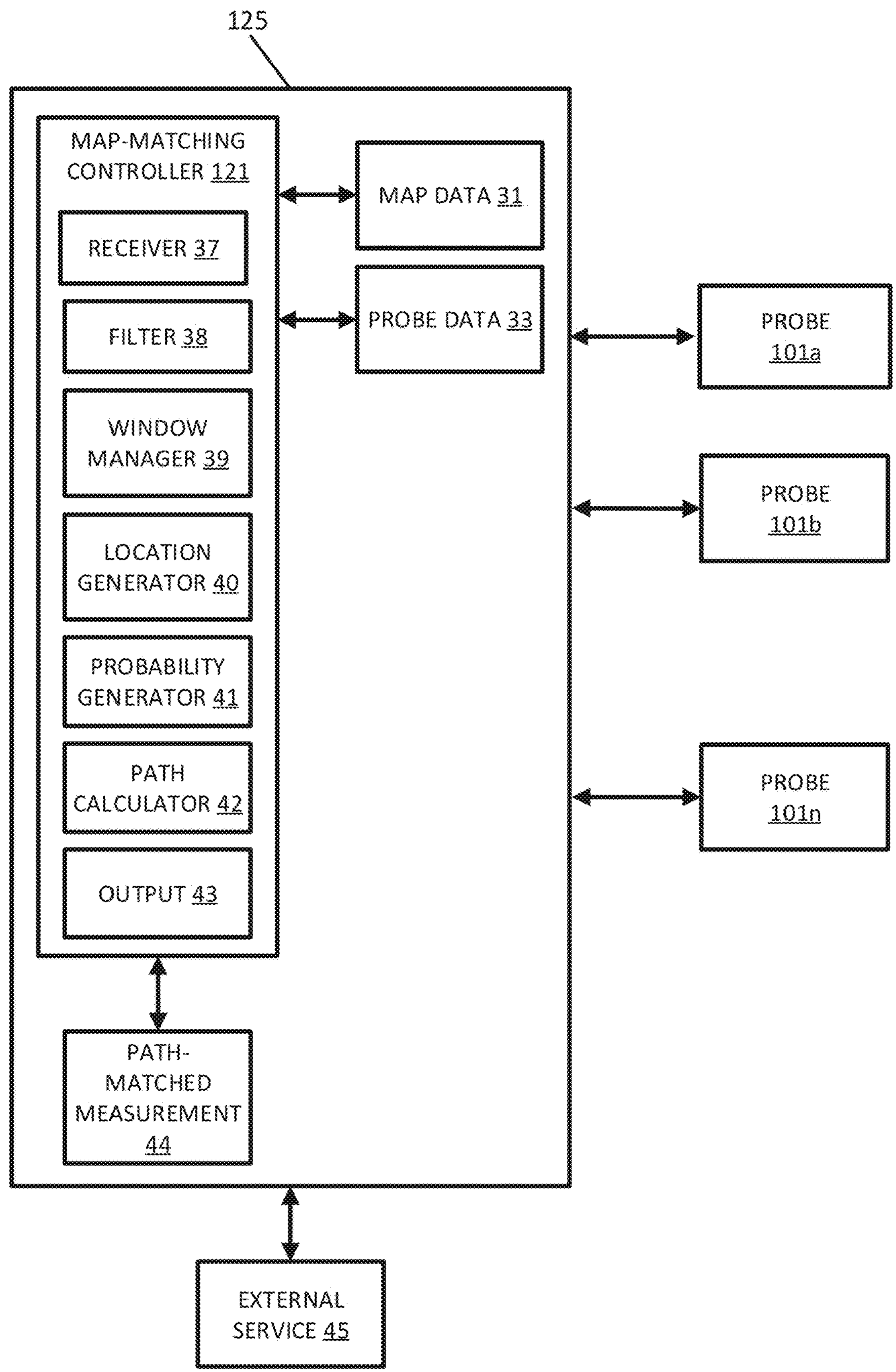
FIG. 2 illustrates an example apparatus for map-matching streaming probe data.

FIG. 2 illustrates an example apparatus for map-matching streaming probe data. The server includes the map-matching controller 121 connected to multiple mobile devices 101*a*-101*n*. The map-matching controller 121 includes a receiver 37, a filter 38, a window manager 39, a location generator 40, a probability generator 41, a path calculator 42, and an output 43. The map-matching controller 121 access data stored in memory or received from the mobile device 101. The data includes map data 31 and probe data 33. The map-matching controller 121 outputs the path-matched probe measurement 44. The server 125 may be in communication with external services 45. Additional, different, or fewer components may be included. For example, the mobile devices 101 may send probe data 33 but not map data 31. In another example, the mobile devices 101 provide the path-matched probe measurement to the server 125. In a further example, the map data 31 is provided by the geographic database 123.

The map data 31 include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data 31. The map data 31 may include structured cartographic data or pedestrian routes.

The map data 31 may include map features that describe the attributes of the roads and intersections. The map features may include geometric features, restrictions for traveling the roads or intersections, roadway features, or other characteristics of the map that affects how vehicles 124 or mobile device 122 flow through a geographic area.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. A limited access road has low accessibility but is the fastest mode of travel between two points. Limited access roads are typically used for long distance travel and have higher vehicle capacities when compared to arterial roads. Collector roads connect limited access roads to local roads. Collector roads are more accessible and slower than limited access roads typically have less vehicle capacity. Local roads are accessible to individual homes and businesses. Local roads are the most accessible and slowest type of road.

The geographic databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, connectivity to other roads, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The receiver 37 is configured to receive a stream of measurements from the probe 101. The measurements may be part of the probe data 33. The receiver 37 may include a transceiver including circuitry for receiving and performing initial processing of the measurements in the probe data 33. The receiver 37 may include an integrated circuit specifically programmed to process the probe data 33. The receiver 37 may have an input channel for communicating with the mobile devices 101. The receiver 37 may receive the measurements from the probe 101 in real time. Additionally or alternatively, the receiver 37 may receive the measurements in groups or batches. The receiver 37 may send the measurements to other modules of the map-matching controller. For example, the receiver 37 may send the measurements to the filter 38 or the window manager 39.

The measurements may correspond to locations in a geographic area. For example, the measurements may correspond to locations in the map data 31. In some cases, the measurements include a measure of a heading, a direction, or a speed of the probe 101.

The filter 38 is configured to apply a filter to the measurements. For example, the filter 38 may apply a temporal filter to the measurements. A temporal filter may be a sub-sampling of the measurements on the temporal dimension. For instance, where measurements are taken every predetermined time interval, the filter 38 may sample the measurements at the rate of once every 5 seconds, 10 seconds, 30 seconds, 60 seconds, or any other rate. Additionally or alternatively, the filter 38 may be configured to apply a spatial filter to the measurements. A spatial filter may be a sub-sampling of the measurements on the spatial dimension. For instance, where two measurements are closer than 5 meters, 10 meters, 30 meters, or any distance between one another, the filter 38 may discard one of the measurements. Filtering may result in fewer measurements being matched to the map, which can reduce the computational load and improve the speed of the map-matching controller 121.

The window manager 39 is configured to fill a window with the stream of probe measurements. The window manager 39 may fill the window with the measurements that have been passed through the filter 38. The window manager 39 may be a circuit or integrated circuit specifically configured to write data from the probe measurements or filtered probe measurements in a data array or data registries, which may be referred to collectively or in the alternative as a data matrix. The data matrix may have a predetermined number of storage locations for the measurements. The data matrix may be a two-dimensional array. Each of the storage locations may be associated with a memory address. When data from the probe measurements are included in all of the storage locations, or in all of the storage locations in a particular dimension, the window is considered full.

The window manager 39 may check if the window is already full. If the window is not full, the window manager 39 may add one or more measurements until the window is full. When the window manager 39 checks and returns that window is full, the window manager 39 may collect an additional measurement.

The window contains the measurements that are going to be matched to locations in the geographic area. The window may have a defined dimension such that a number of measurements will fill the window. For example, the window may be filled by 3, 4, 5, or another number of measurements. The window manager 39 may set the dimension of the window based on a property of the probe, the path, or the geographic location. For example, the window manager 39 may set the dimension of the window based on a heading, speed, or position of the probe. In another example, the window manager 39 may set the dimension of the window based on a road functional class of a path. In a further example, the window manager 39 may set the dimension of the window based on a path density in the geographic area.

Because the window manager 39 may fill the window as the measurements are received by the receiver 37 (or as the measurements are filtered by the filter 38), a larger window can result in a longer delay before the measurements are map-matched. In some cases, the window manager 39 sets the dimension of the window based on a desired or acceptable level of delay. The delay level may be set based on the geographic database 123, the probe 101, or an external service 45. The window manager 39 may set the level of delay. For example, to achieve a delay of less than a minute, the window manager 39 may set the dimension of the window such that the window is full after five measurements have been added to the window. The window manager 39 may set the dimension of the window to be filled by more or fewer measurements. For example, the window manager 39 may set the window dimension to fit a single measurement.

The window manager 39 is configured to select an additional measurement from the stream of measurements. The additional measurement is not held in the window initially, but the window manager 39 may be configured to add the additional measurement to the window when a measurement in the window has been map-matched by the map-matching controller 121 and removed from the window by the window manager 39.

The window manager 39 is configured to select an oldest measurement in the window. The oldest measurement in the window may be the first measurement of the stream that is map-matched. In some cases, the oldest measurement is the first measurement placed in the window by the window manager 39.

The location generator 40 is configured to determine at least one candidate location for the measurements in the window and for the additional measurement. A candidate location may refer to a particular location on a particular path. The candidate location is a possible location in the geographic area that the probe measurement corresponds to. For example, due to uncertainty in the probe measurement, a GNSS location may indicate that a probe was on a first path when it took the measurement, but the probe may have actually been on a different path. The location generator 40 may be configured to generate more than one candidate location for a measurement. For example, the location generator 40 may be configured to generate two candidate locations referring to different locations on the same path or different paths.

The location generator 40 determines the candidate locations for the measurements by searching the area around the measurements in the geographic area. For example, the location generator may search in an area within a predetermined distance (e.g., 5 meters) of the indicated location of the measurement. The location generator 40 may search within a radius of a probe measurement. The search may be weighted by the functional classification of the candidate location. Where a previous probe measurement was matched to a candidate location with a functional classification, the location generator 40 may gather candidate locations with the same functional classification for a following probe measurement.

The location generator 40 may rank the candidate locations for a measurement according to the probability that the candidate location is the correct (e.g. map-matched) location for the measurement. For example, the location generator 40 may rank based on probabilities determined by the probability generator 41. The location generator 40 may discard candidate locations that are below a threshold probability of matching with the measurement to reduce computational complexity in map-matching. In some cases, the location generator 40 determines a set number of candidate locations for the measurement. For example, the location generator 40 may determine only 5, 4, or 3 candidate locations for the measurement. The location generator 40 may keep less than the number of candidate locations generated for the measurement. For example, the location generator 40 may be configured to generate up to 5 candidate locations for a measurement, and the location generator 40 discards all but the 3 candidate locations with the highest probability of matching to the measurement. Other amounts of candidate locations may be generated or discarded. In a further example, the location generator determines all the possible candidate locations for a measurement but discards all but the 5 candidate locations with the highest probability of matching with the measurement. Where the discarded candidate locations have a lower probability of matching than the candidate locations that are kept, the complexity of determining map-matching may be reduced without significantly increasing a map-matching error rate.

The probability generator 41 determines the probability that a candidate location corresponds to a measurement. For example, the probability generator 41 may determine the probability based on distance between the probe measurement and the candidate location, a speed of the probe, a heading of the probe, or a direction of the probe. Additionally or alternatively, the probability generator 41 may determine the probability based on a property of the candidate location (e.g. a functional class, speed limit, or road travel restriction), network graph connectivity, a geometric feature, or a roadway feature. For example, the probability generator 41 may determine that there is a low probability of matching a measurement to a candidate location that is not connected to any or many other candidate locations, based on the network graph connectivity. In another example, the probability generator selects one or more closest candidate location to the measurement and assigns a low matching probability to other candidate locations that are not connected to the selected closest candidate locations within a number of links within the network graph. The probability generator 41 may determine the probability for each measurement in the window and for the additional measurement.

The probability generator 41 may be further configured to determine transition probabilities between the candidate locations. Determining the transition probabilities may involve the probability generator 41 running an A* search on the candidate locations. In some cases, the probability generator 41 may determine the probability that one candidate location leads to another based on network graph connectivity. For example, if there is no road segment or link connecting two candidate locations, the probability generator 41 may determine that a transition probability between the two candidate locations is low. In a further example, if a first candidate location is connected (e.g. in the map or by a road segment) to a single second candidate location, the probability generator 41 may determine that a transition probability between the two candidate locations is high. Additionally or alternatively, the probability generator 41 may determine the transition probability based on the probability that a candidate location will match with a measurement.

The path calculator 42 matches the oldest measurement to a candidate location based on a path connecting the candidate locations in the window. In some cases, the path calculator 42 will calculate multiple paths connecting the candidate locations in the window and match the oldest measurement to a candidate location for the oldest measurement lying on one of the paths. For example, the path calculator 42 may calculate a least-cost or highest-probability path connecting the candidate locations and match the oldest measurement to the candidate location lying on the path. The least-cost or highest probability-path may be determined based on the transition probabilities between the candidate locations. In some cases, the path is a Viterbi path. Additionally or alternatively, the path may be determine based on the probability that a candidate location will match to the respective measurement. The path calculator 42 may determine a path for all or less than all of the candidate locations for the measurements in the window. In some cases, the path calculator 42 determines a path for the candidate locations of the measurements in the window and for the additional measurement. Increasing the number of candidate locations (e.g. by increasing the number of measurements or the number of candidate locations for each candidate used in creating the path) may reduce errors in matching the oldest measurement to a candidate location.

The output 43 is configured to output a path-matched probe measurement 44 based on the candidate location matched to the oldest measurement. For example, the path-matched probe measurement 44 may describe a node or road segment that probe was on or near when it took the measurement. Additionally or alternatively, the path-matched probe measurement 44 may include the information of the probe measurement as well. For example, the path-matched probe measurement 44 may include a latitude, longitude, speed, heading, or direction of the probe. The output 43 may provide the path-matched probe measurement to an external service 45, the server 125, or to one or more of the mobile devices 101. For example, the output 43 may provide the path-matched probe measurement 44 to the server 125 to update the geographic database 123.

The external service 45 may provide a location-based service based on the path-matched probe measurement 44. For example, the external service 45 may provide a traffic level near the mobile device 101 based on the path-matched probe measurement 44. In another example, the external service 45 provides a navigation service based on the path-matched probe measurement 44.

Figure 3:
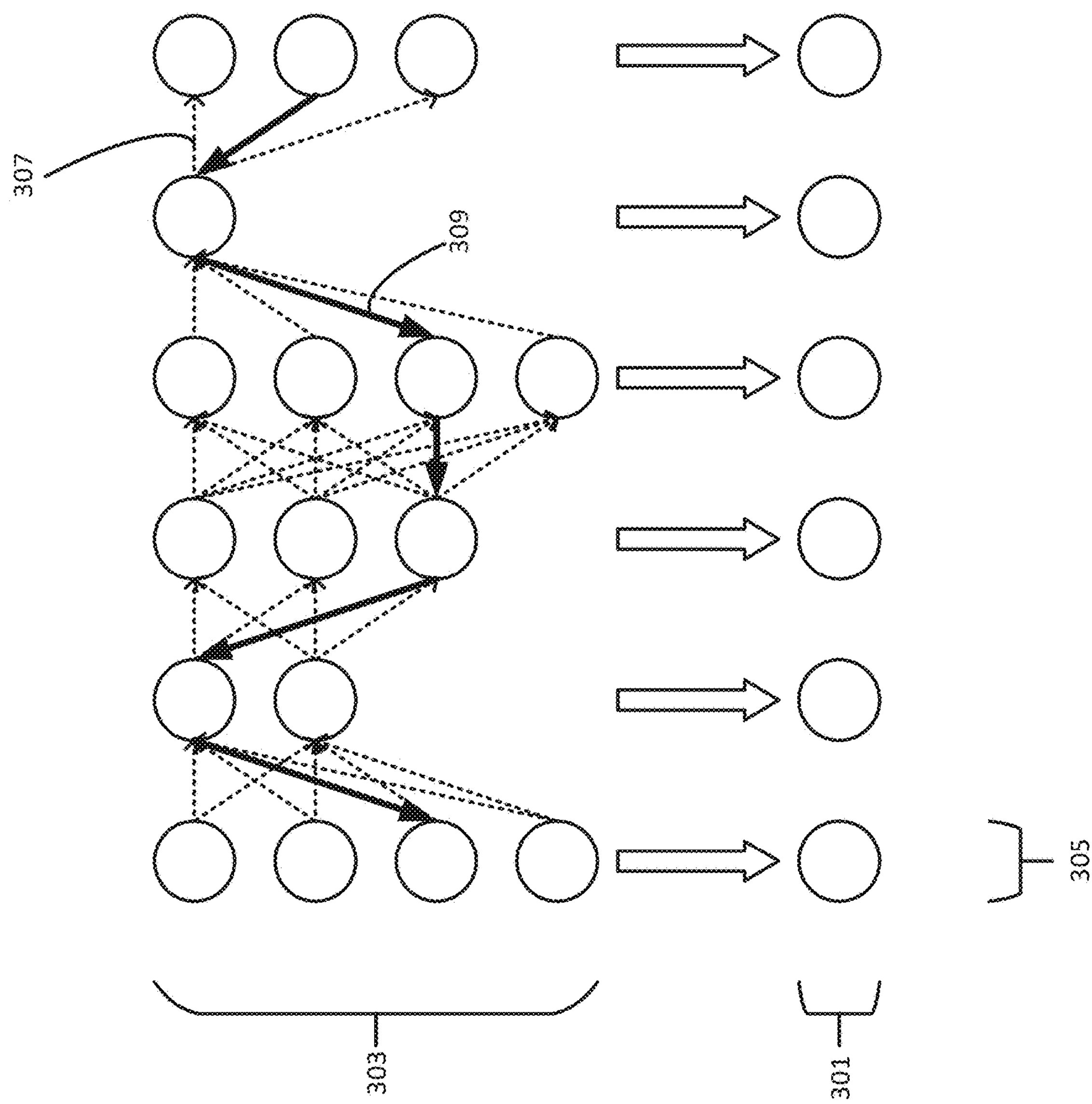
FIG. 3 illustrates an example of a batch approach to map-matching.

FIG. 3 illustrates an example batch approach to map-matching. Observations 301 are shown along the bottom as circles. For example, the observations 301 may be probe measurements. For each observation 301, there are one or more hidden states 303 represented as circles. For example, the hidden states 303 may be candidate locations. The hidden states 303 generated for an observation 301 are organized in a column 305. Transition probabilities 307 between the states is shown as a series of dashed arrows leading from left to right.

The batch-approach to map-matching seeks to determine which hidden state 303 was the most likely to cause an observation 301. For example, when applied to probe measurements taken on a trip, the approach determines the most likely candidate location or road segment (e.g. hidden state 303) where each measurement (e.g. observation 301) was taken. The trip may advantageously be modeled as a HMM because of the errors in the GNSS system of the probe that can be intermittently inaccurate, in some cases, making point-based map-matching difficult. Even in an ideal case where the GNSS probe measurement has no error, some situations can be very ambiguous, such as when the probe is positioned on a stacked road segment. Here, even if the latitude and longitude position of the probe measurement is accurate, there is no way of knowing if the probe is driving on the top road or the one directly underneath it (e.g. on a double-decker bridge). The batch-based approach solves the stacked road segment problem by relying on the connectivity between the road segments (e.g. the hidden states 303). For example, if one of the later measurements is likely taken from a road segment that can only be reached in a feasible time by one of the other road segments, then the probe must have been on that road segment when it took the previous measurement.

The batch-based approach determines the most likely candidate locations by determining the probability that each hidden state 303 generated the observation 301 (e.g. for each column 305), determining transition probabilities 307 between the hidden states 303 (e.g. how likely is it that the observer would move between two hidden states), creating one or more paths 309 through the hidden states 303, and choosing a most-likely or least-cost path 309.

The batch-based approach requires that all the observations from the trip are collected before the approach determines the most likely hidden state 303 that generated an observation 301. For a trip that lasts for two hours, such a delay before determining a map-matched probe observation may be undesirable for real-time location-based service providers such as a real-time traffic engine or a navigation application.

Figure 4:
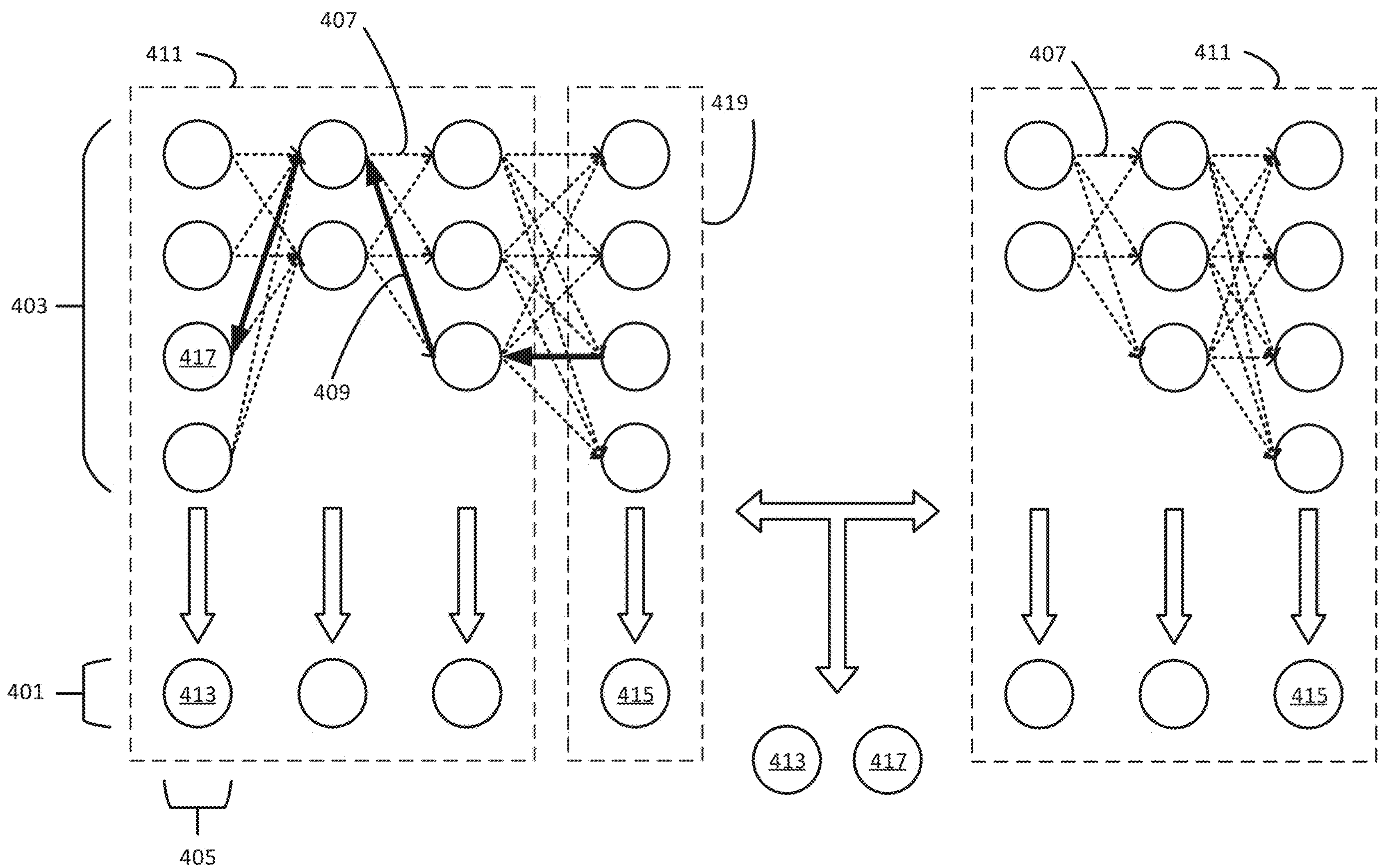
FIG. 4 illustrates an example of a sliding window map-matcher.

FIG. 4 illustrates an example sliding window map-matcher. While the batch-based approach waits for all the observations on a trip to be collected before performing map-matching, the SWMM performs map-matching once a window 411 of observations 401 has been collected. Where the number of observations 401 that the window 411 may store is smaller than the total number of observations 401 for the trip, the SWMM performs map-matching with less delay than a batch-based approach. The reduced delay may be used by real-time location-based service providers such as a real-time traffic engine or a navigation application.

The SWMM may be provided on a computer and perform map matching on observations 401 from a probe. For example, the SWMM may be provided by the map-matching controller 121 on observations 401 in probe data 33 from the probes 101 in FIG. 2. Additionally or alternatively, the SWMM may be provided by a mobile device. For example, the SWMM may be provided by the mobile device 122 on observations 401 from the probe 101 in FIG. 1. In some cases, the SWMM may be distributed across multiple devices or use observations 401 from multiple probes. For example, a mobile device may filter probe observations 401 or manage the window 411 and one or more steps of the SWMM may be performed by a map-matching controller. In another example, multiple probes send observations 401 to be map-matched by the SWMM.

The SWMM fills the window 411 with observations 401 from a probe. In some cases, the receiver 37 of FIG. 2 receives the observations 401 that fill the window. The window 411 may have a dimension, k, that determines how many observations 401 will fill the window. The SWMM may check that the window has stored less than k measurements. If there are less than k measurements in the window, the SWMM may add measurements to the window until k measurements are stored by the window. If the window is full, the SWMM may collect an additional measurement. While higher values of k may improve accuracy in map matching, lower values of k may reduce the initial delay before the SWMM performs map-matching on the observations 401. For example, k may be set so that 3, 5, or another number of observations 401 from the probe fill the window 411. In some cases, the window manager 39 of FIG. 2 sets the value of k based on a geographic database 123, an external service 45, or the probe 101. In FIG. 4, k is set to 3, so 3 observations 401 are present in the window 411 when the window 411 is full. In some cases, k may be chosen to keep the initial delay below a minute. For example, real-time location-based services may use a lower value of k to reduce delay before map-matching with the SWMM. When k is set to one (e.g. where the window is filled by a single observation 401), the SWMM may default to an improved version of a point-based map-matcher that leverages both past and future states to provide a match, improving precision greatly while keeping the map-matching delay to a reasonable size.

The window 411 may be filled chronologically. For example, the SWMM may fill the window 411 in the order the observations 401 were taken by the probe or in the order the observations 401 were received by the SWMM. In some cases, the window manager 39 of FIG. 2 sets the dimension of the window 411 and fills the window 411 with observations 401.

When the window 411 is full of observations 401, the SWMM receives an additional observation 415 from the probe. The observation 415 is additional because it is beyond the number of measurements 401 that are stored by a full window 411. In some cases, the additional observation may be a new observation, an outside observation, or a non-windowed observation. In some cases, the window manager 39 of FIG. 2 receives the additional observation 415. Additionally or alternatively, the SWMM may receive the additional observation 415 before the window is full.

When the window 411 is full and the additional observation 415 is present, the SWMM generates one or more hidden states 403 for the observations 401 in the window 411. The hidden states 403 may correspond to candidate locations for the observations 401. The SWMM may generate the hidden states 403 by searching for road segments, paths, or nodes in an area around an observation 401. For example, the SWMM may collect hidden states within 10 meters of the location of an observation 401. In some cases, the location generator 40 of FIG. 2 generates hidden states 403 as candidate locations for the observation 401.

The SWMM may limit the number of hidden states 403 generated for the observations 401. Restricting the number of candidate locations generated may reduce computational complexity without significantly increasing the error rate of map-matching. For example, the SWMM may limit the number of hidden states 403 to 3, 4, or 5 hidden states 403 for each observation 401.

TABLE 1

| Temporal Filter [seconds] | Maximum Observations (M) | Maximum Hidden states (X) | Error Percentage |
|---|---|---|---|
| 15 | >5 | >5 | 8.13 |
| 15 | >5 | 5 | 8.13 |
| 15 | 5 | 5 | 8.13 |
| 15 | 3 | 3 | 8.13 |
| 15 | 3 | 2 | 8.15 |
| 5 | >5 | >5 | 5.54 |
| 5 | >5 | 5 | 5.54 |

TABLE 1-continued

| Temporal Filter [seconds] | Maximum Observations (M) | Maximum Hidden states (X) | Error Percentage |
|---|---|---|---|
| 5 | 5 | 5 | 5.54 |
| 5 | 3 | 3 | 5.56 |
| 5 | 3 | 2 | 5.61 |
| 1 | >5 | >5 | 4.78 |
| 1 | >5 | 5 | 4.78 |
| 1 | 5 | 5 | 4.78 |
| 1 | 3 | 3 | 4.85 |
| 1 | 3 | 2 | 4.90 |

Table 1 shows the error rates of map-matching based on different numbers of hidden states 403. For example, the first row of data shows a case where a 15 second temporal filter was applied to the observations 401 and there were no limits on the number of hidden states 403 that were generated for the observations 401. Without limiting the number of hidden states, map-matching resulted in an 8.13% error rate. Limiting the SWMM to two hidden states 403 (e.g. the top two most probable hidden states 403) per observation 401 resulted in only a slight increase in error rate at 8.15%. Because reducing the number of hidden states 403 per observation 401 greatly reduces the computational complexity of map-matching without significantly increasing the error rate, real-time map-matchers may employ the SWMM.

The SWMM calculates the probability that the probe was at a hidden state 403 when it generated the observation 401. For column 405, for example, the SWMM calculates the probability that each of the four hidden states 403 led to the creation of the observation 413. The SWMM may calculate the probability for all the observations 401 in the window and for the additional observation 415. The SWMM may determine the probability of a match between the hidden states 403 and the observation 401 based on the distance between the hidden state 403 and the observation 401, an accuracy of the observation 401, a speed of the probe, a heading of the probe, or a direction of the probe. For example, where the probe observation is accurate to 8 meters, the SWMM may determine that hidden states 403 within 8 meters of the observation 401 are more probable than hidden states 403 that are more than 8 meters from the observation. Other accuracy distances may be used, for example, 5 meters, 10 meters, or another distance. The distance may be a linear or great-circle distance. Additionally or alternatively, the SWMM may determine the probability based on a property of the hidden state 403 (e.g. a functional class, speed limit, or road travel restriction), a geometric feature, or a roadway feature. In some cases, the probability generator 41 of FIG. 2 generates the probabilities.

The SWMM may further limit the number of hidden states 403 for each observation 401 based on probability. For example, the SWMM may rank the hidden states 403 for an observation 401 according to probability and keep only the top 3, 4, or 5 hidden states. For example, the SWMM may remove the hidden states 403 in order from lowest-probability to highest probability based on the ranking so that the most probable hidden states 403 remain within the limited number of hidden states 403. Additionally or alternatively, the SWMM may remove hidden states 403 with a probability below or at a threshold probability.

The SWMM calculates transition probabilities 407 (represented as a series of dotted lines between the hidden states 403 leading from left to right) for the hidden states 403. A transition probability 407 is the probability that the probe passed from one hidden state 403 to the next as the observations 401 were being taken. Determining the transition probabilities 407 may involve the SWMM running an A* search on the candidate locations. The SWMM may determine the transition probability 407 based on network graph connectivity. For example, if there is no road segment or link connecting two hidden states 403, the SWMM may determine that a transition probability 407 between the two hidden states 403 is low or zero. In a further example, if a first hidden state 403 is connected (e.g. in the map or by a road segment) to a single second hidden state 403, the SWMM may determine that a transition probability 407 between the two hidden states 403 is high. In some cases, the probability generator 41 of FIG. 2 generates the transition probabilities 407.

The SWMM determines a path 409 (represented as a series of solid black arrows leading right to left) between the hidden states 403. The SWMM may determine the path 409 based on the transition probabilities 407. The path 409 may be a least-cost or a most-likely path 409 where the transition probabilities 407 represent costs of links between or probabilities of the probe traveling on paths between the hidden states 403. The most-probable path may span the most-probable links between hidden states 403 that have the highest transition probabilities 407. In some cases, the transition probabilities 407 may be represented as a cost of linking two hidden states. The least-cost path may be found by performing an A* search over the hidden states 403 with the transition probabilities 407 representing the cost of traveling from one hidden state to another. In some cases, the path 409 is a Viterbi path. The path 409 may span across all or less than all the columns of hidden states 403 in the window 411. The path 409 may also include the hidden states of the additional observation 415, as shown in zone 419. In some cases, the path calculator 42 of FIG. 2 determines the path between the hidden states 403.

The SWMM selects an oldest observation 413 in the window. Based on the path 409, the SWMM matches the oldest state 413 to a hidden state 417. The hidden state 417 may be the most likely location of the probe when the observation 413 was taken.

The SWMM outputs the oldest observation 413 and the matched hidden state 417 as a state-matched probe observation. The state-matched probe observation may be used to provide a location-based service. In some cases, the output 43 of FIG. 2 outputs the state-matched probe observation as a path-matched probe measurement.

The SWMM removes the oldest observation 413, the matched hidden state 417, and the remaining (e.g. unmatched) hidden states 403 in column 405 from the window 411. The SWMM updates the window 411 to include the additional observation 415 and the hidden states 403 in zone 419. The existing probabilities between the observations 401 and the hidden states 403 may be retained in the window 411. Additionally, the transition probabilities 407 may be retained. In some cases, the paths 409 may be retained. For example, the SWMM may retain the most-likely or the least-cost path 409. By retaining the probability and path 409 information, the marginal computational expense of map-matching further observations is reduced. In some cases, the window manager 39 of FIG. 2 may remove the oldest observation 413 and hidden states 403 and update the window 411.

With the updated window 411, the SWMM may iterate on the process described above. The SWMM receives a second additional observation 401, as above, from the probe. In some cases, the window manager 39 of FIG. 2 receives the second additional observation 415.

Because the SWMM retains the probability information for the observations 401 and the hidden states 403 in the updated window 411, the SWMM may generate one or more hidden states 403 for the second additional observation 401 and not for the other observations 401 in the window 411. The SWMM may generate hidden states 403 for the second additional observation 401 as described above. In some cases, the location generator 40 of FIG. 2 generates hidden states 403 as candidate locations for the second additional observation 401.

The SWMM calculates the probability that the probe was at a hidden state 403 when it generated the second additional observation 401 for each of the hidden states 403 generated for the second additional observation 401. Additionally or alternatively, the SWMM may recalculate the probability information for all or part of the hidden states 403 in the updated window 407. The probability may be determined as described above. In some cases, the probability generator 41 of FIG. 2 generates the probabilities for the hidden states 403, including the hidden states 304 of the second additional observation 401.

The SWMM calculates transition probabilities 407 for the hidden states 403 of the second additional observation 401. The SWMM may calculate the transition probabilities 407 between the hidden states 403 of the second additional observation 401 and the rightmost observation 401 in the window 411. For example, the SWMM may calculate the transition probabilities 407 between the hidden states 403 of the second additional observation 401 and the hidden states 403 of the additional measurement 415 which was added to the updated window 411. Additionally or alternatively, the SWMM may recalculate the transition probabilities 407 of all or part of the hidden states 403 in the updated window 411 based on the new hidden states 403 of the second additional observation 401. The transition probabilities 407 may be calculated as described above. In some cases, the probability generator 41 of FIG. 2 generates the transition probabilities 407 for the hidden states 403 of the second additional measurement 401.

The SWMM determines an updated path 409 between the hidden states 403 of the updated window 411 and the hidden states 403 of the second additional observation 401. The path 409 may be a least-cost or a most-likely path 409. In some cases, the path 409 is a Viterbi path. The path may be determined as described above. In some cases, the path calculator 42 of FIG. 2 determines the path between the hidden states 403, including the hidden states 403 of the second additional observation 401.

The SWMM selects an oldest observation 401 from the window for map-matching. Based on the updated path 409, the SWMM matches this second oldest observation 401 to a respective hidden state 403. For example, the SWMM matches the second oldest observation 401 to the hidden state 403 for the second oldest observation 401 that lies on the most-probable or least-cost path. The SWMM may match the second-oldest observation 401 in a similar way as the oldest observation 413 was matched to a hidden state 403.

The SWMM outputs the second oldest observation 401 and the matched hidden state 417 as a state-matched probe observation. In some cases, the output 43 of FIG. 2 outputs the state-matched probe observation as a path-matched probe measurement.

Once the second oldest observation 401 is output, the SWMM may remove the second-oldest observation 401 and the respective hidden states 403 from the window 407. In this way, the SWMM can continue to iterate and map-match the entire stream of probe observations by receiving further additional observations 401 from the probe and repeating the process.

Figure 5:
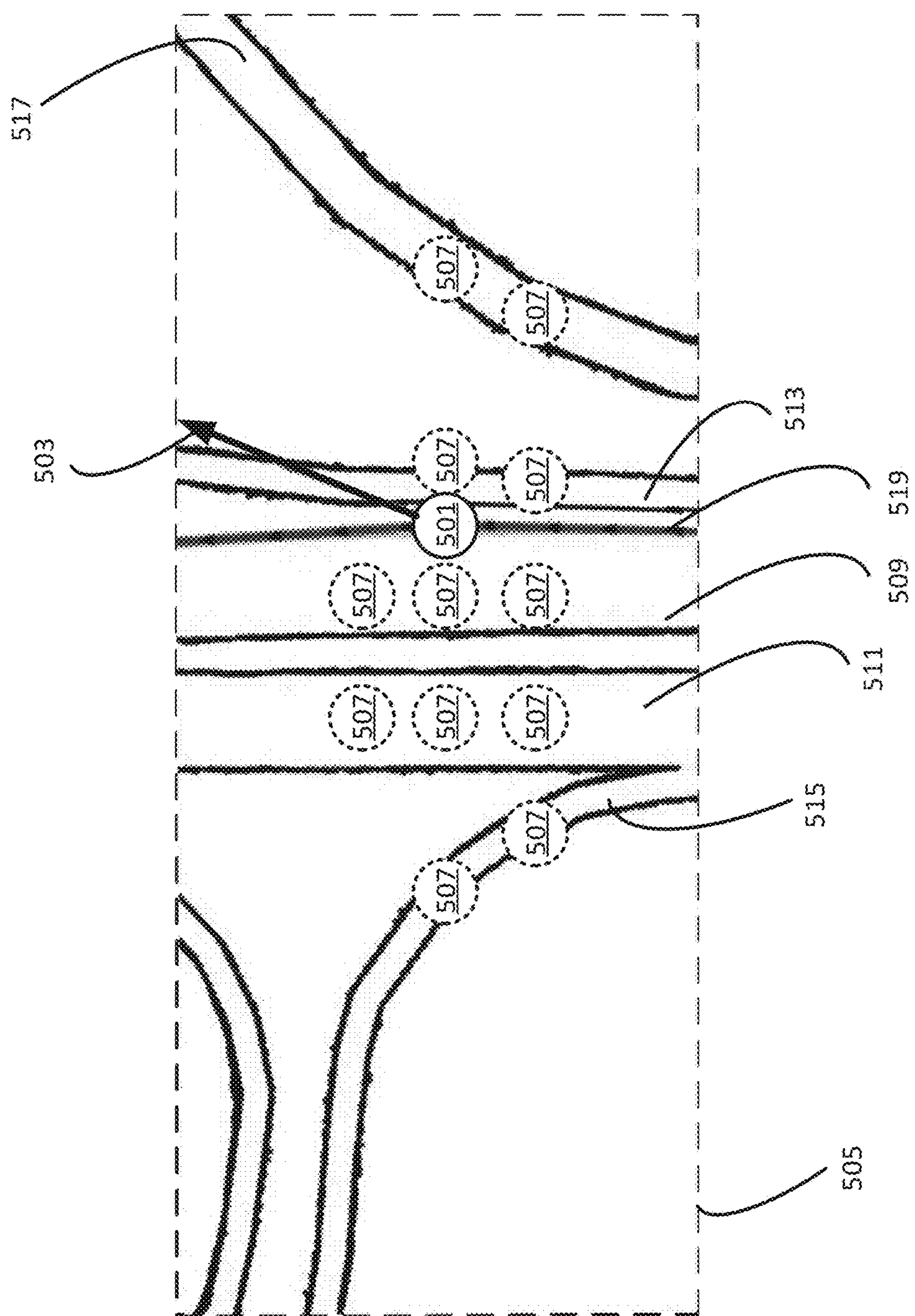
FIG. 5 illustrates an example of candidate locations for a probe measurement.

FIG. 5 illustrates an example of candidate locations for a probe measurement. In FIG. 5, a probe measurement 501 with a heading 503 is placed within a geographic area 505. One or more candidate locations 507 may be distributed in the geographic area 505. The candidate locations 507 may correspond to locations on paths 509, 511, 513, 515, 517 within the geographic area 505.

The probe measurement 501 may be a measurement in a stream of measurements 519 from the probe. In some cases, the probe measurement 501 has a heading 503. The probe measurement 503 may contain additional information. For example, the probe measurement may include a speed of the probe and a direction of travel. The probe measurement 501 may correspond to the probe observation 301, 401 in FIGS. 3 and 4.

The geographic location 505 may be a location on a map containing the probe measurement 501. For example, the geographic location may be an area within 5, 10, or 30 meters of the probe measurement 501. Other distances may be used. In some cases, the geographic area 505 may be defined by a circle, square, rectangle, or other shape. The shape defining the geographic area 505 may be located or oriented according to a property of the probe measurement 501. For example, the shape may be centered on the probe measurement 501. In another example, the shape is oriented in the direction of travel of the probe measurement 501 as indicated by the heading 503 or by the stream of probe measurements 519. In a further example, the shape is oriented as to capture a number of candidate locations 507 in the geographic area 505 or based on a density of the paths 509, 511, 513, 515, 517 in the vicinity of the probe measurement 501.

The candidate locations 507 may represent locations on paths 509, 511, 513, 515, 517 in the geographic area. The candidate locations 507 may represent different paths or different locations on the same path. The candidate locations 507 may correspond to road segments or nodes. For example, the candidate locations 507 may correspond to segments or nodes in the geographic database 123 of FIG. 1. In some cases, the candidate locations 507 correspond to the hidden states 303, 403 of FIGS. 3 and 4.

The candidate locations 507 may be found by a map-matcher searching within the geographic area 505. For example, the location generator 40 of FIG. 2 may search within the geographic area 505 to determine the candidate locations 507. In another example, the SWMM determines the candidate locations 507 for the probe measurement 501 in the geographic area 505. The candidate locations 507 may be determined based on the location, heading, speed, direction, or other properties of the probe measurement 501. Additionally or alternatively, the candidate locations may be determined based on properties of the map information contained within the geographic area 505. For example, candidate locations 507 may be determined that are within 10 meters of the probe measurement and on paths that support traffic flow in the direction of the heading 503.

Map-matching seeks to match the probe measurement 501 to a candidate location 507 in the geographic area 505. For example, the location of the probe measurement 501 shows the probe on the highway path 519 with a heading 503 pointed toward an exit ramp 513. However, due to uncertainty in the GNSS measurement of the probe, the actual location of the probe could be on the exit ramp 513, on the other side of the highway 511, on the on ramp 515, or on another road 517. On those paths 509, 511, 513, 515, 517, the true location of the probe at the time it recorded the measurement 501 could be at a different location along the paths 509, 511, 513, 515, 517. For example, the probe could have been further along the road or further behind the indicated location when it recorded the measurement 501.

The SWMM (or the location generator 40) may restrict the number of candidate locations 507 that are determined for the probe measurement 501. The maximum number of candidate locations 507 for a probe measurement 501 may be defined as a parameter M. For example, the SWMM may set M such that a maximum 3 or 5 candidate locations 507 are determined for each probe measurement 501. More or fewer candidate locations 507 may be determined. For example, where M is unbounded, the number of candidate locations determined may not have a maximum limit. The number of candidate locations 507 determined within the geographic area 505 may be based on the location, heading, speed, direction, or other properties of the probe measurement 501 or based on properties of the map information of the geographic area 505. For example, where the probe measurement indicates a high speed (e.g. typical of highway driving) the number of candidate locations 507 may be reduced. Because a probe on the highway may be unlikely to change course abruptly, reducing the number of candidate locations 501 determined may increase the speed of map-matching without significantly increasing the error of the map-matching process. In another example, where there is a high density of paths 509, 511, 513, 515, 517 in the geographic location 505 the number of candidate locations 501 may be increased. For example, in a dense urban area, the number of candidate locations 507 could be upward of 30.

The SWMM (or the location generator 40) may further refine the number of candidate locations 507 determined for the probe measurement 501. A lower number of candidate locations 507 may reduce the complexity of determining the transition probabilities between candidate locations (or hidden states) during map-matching, for example. The number of defined candidate locations that are retained may be defined as the parameter X.

The SWMM (or the probability generator 41) may determine the probability that the probe measurement 501 was taken at a candidate location 507. The probability may be based on a property of the probe, a property of the probe measurement 501, a property of the candidate location 507, a distance between the candidate location 507 and the probe 501, a property of the path 509, 511, 513, 515, 517, or a property of the geographic area 505. For example, candidate locations 507 that are further away from the probe measurement 501 may have a lower probability of matching with the probe measurement 501. In another example, paths 509, 511, 513, 515, 517 that do not allow for traffic flow in the direction of the heading 503 of the probe measurement 501 would have a lower probability. Because the heading of the probe is pointing toward the exit ramp 513, the candidate locations 507 on the ramp 513 may have a higher probability of matching with the probe measurement 501. Because the location of the probe measurement 501 is on the highway 509, the candidate locations 507 on the highway path 509 may have higher probability. In a further example, where the speed of the probe indicates that the probe is traveling at highway speeds, candidate locations 507 on the surface road 517 may have a lower probability if the speed limit on the surface road 517 is lower than the speed of the probe.

Based on the probabilities of the candidate locations 507 matching with the probe measurement 501, the SWMM (or the location generator 40) may rank the candidate locations 507. The SWMM (or the location generator 40) may remove candidate locations 507 based on the probability such that only X candidate locations 507 remain for each probe measurement 501. For example, only the top 3 or 5 candidate locations 507 with the highest probability may be kept. In another example, the candidate locations 507 are ranked from lowest probability to highest probability of matching with a measurement 501 and removed in order from lowest probability to highest probability so that the most probable candidate locations 507 remain up to a set limited number of candidate locations 507 per measurement 501. In some cases, the limit or number of candidate locations 507 that may be kept for each measurement 501 may be set by the SWMM or the location generator 40. Different numbers of candidate locations may be kept. The number of candidate locations to be kept may be determined by the SWMM (or the location generator 40) based on the location of the probe or the geographic area. For example, where there is a high density of paths or candidate locations within the geographic area 505, a higher number of candidate locations 507 may be kept. Additionally or alternatively, the SWMM (or the location generator 40) may only keep candidate locations 507 over a certain threshold probability. For example, only candidate locations with greater than a 10% chance of matching with the probe measurement 501 may be kept. Pruning candidate locations 507 with low probability may have a negligible decrease in the accuracy of the map-matching while significantly reducing the computational complexity. For example, it may be less computationally complex to calculate the transition probabilities between a lower number of candidate locations 507 (or hidden states). Where computing the transition probabilities requires running an A* search on the number of candidate locations 507 (or the hidden states), defined as S, for all the probe measurements 501 (or observations 401) in a window, the complexity may be defined as $S^2$ A* searches. Where X<M<S, the complexity of the calculating the transition probabilities becomes $(XM)^2$ A* searches, which is less than $S^2$ A* complexity.

Figure 6:
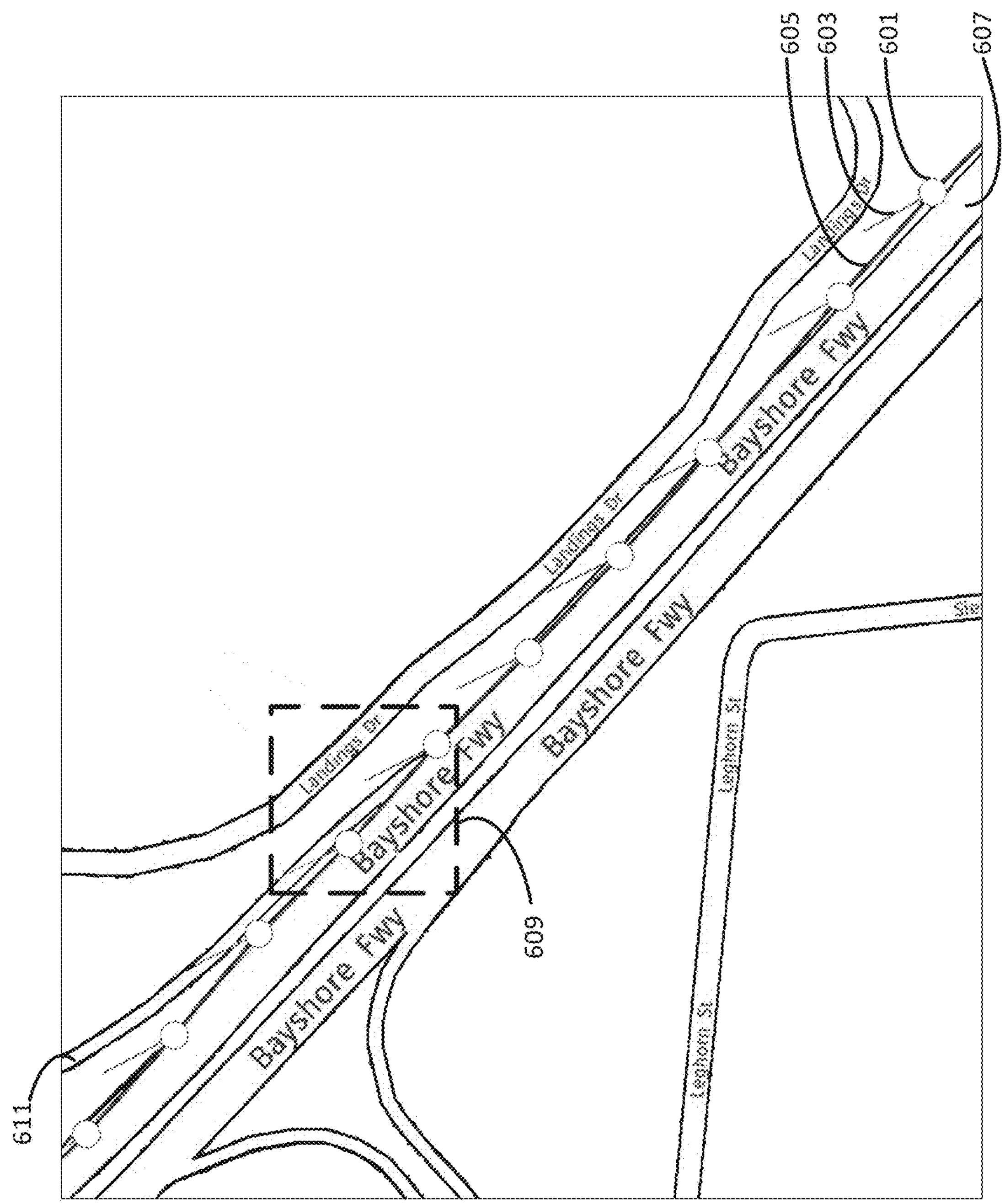
FIG. 6 illustrates an example of a stream of probe measurements.

FIG. 6 illustrates an example of a stream 605 of probe measurements 601. The probe measurements 601 have been matched to a path 607. The probe measurements 601 may have a heading 603. FIG. 6 shows the successful result of map-matching the stream 605 of probe measurements 601 by the SWMM approach.

For the two probe measurements 601 in the region 609, map-matching approaches other than the SWMM may incorrectly match the probe measurements 601 to a path 607 other than the highway. Because the location of the probe measurements 601 in the region 609 is closer to the exit ramp 611 (possibly due to uncertainty in the GNSS measurement) and because the heading 603 of the probe measurements 601 is directed toward the exit ramp 611, a point-based map-matcher would match the probe measurements 601 to the exit ramp 611. The SWMM approach is able to avoid an incorrect match because the probe measurements 601 coming after the probe measurements 601 in the region 609 are on the highway 607 and not on the onramp 611. When the SWMM approach matches the probe measurements 601 in the region 609 to the map, the SWMM will have k additional probe measurements 601 in the window which are on the highway 607. Because the SWMM approach map-matches a probe measurement 601 based on future probe measurements 601, and because the exit ramp 611 does not immediately lead back to the highway 607, the SWMM approach has greater accuracy in map-matching than a point-based approach in the context of FIG. 6.

Figure 7:
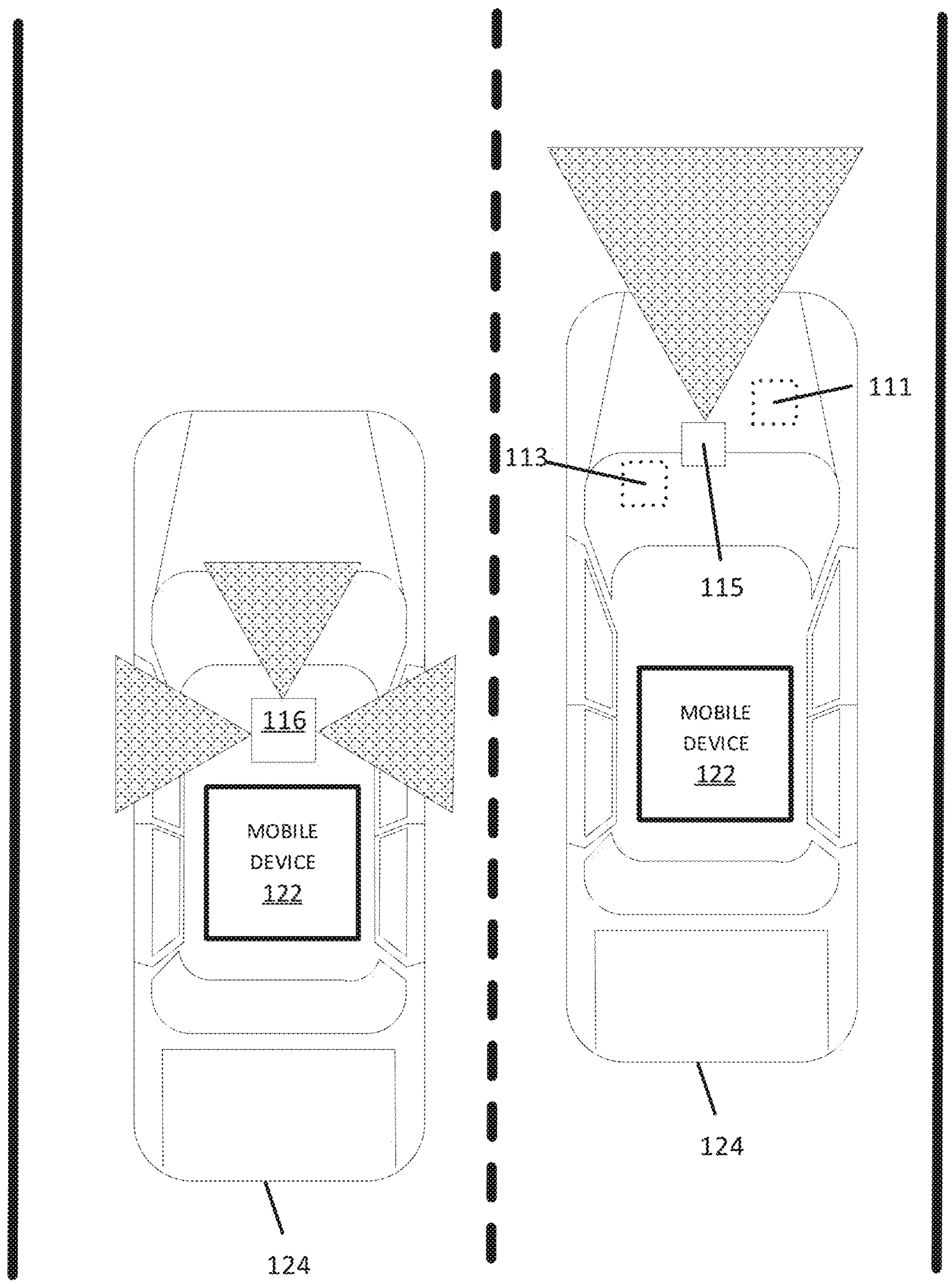
FIG. 7 illustrates an exemplary vehicle of the systems of FIG. 1.

FIG. 7 illustrates an exemplary vehicle of the systems of FIG. 1. The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124.

The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to geographic data received from geographic database 123 and the server 125 and driving commands or navigation commands.

Autonomous vehicles use map-matching to aid in navigation by reinforcing other sensors on the autonomous vehicle. For example, where a camera on the autonomous vehicle sees a road sign, an accurate location of the vehicle location generated by map-matching is needed to determine whether or not the autonomous vehicle needs to navigate based on the road sign. In this way, accurate-map matching results in accurate navigation of autonomous vehicles and reinforces other sensory system on the vehicle.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands.

HAD vehicles use map-matching to place the vehicle on a map. For example, a visual representation of the road may be displayed by a HAD vehicle to aid a driver. Accurate map-matching ensures that the displayed map representation matches what the driver sees from his viewpoint.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and driving commands or navigation commands.

ADAS vehicles use map-matching to accurately place the vehicle in the environment. For example, map-matching is used to match the ADAS vehicle to a road segment. If the road segment is connected to another road segment that is a downhill slope, the ADAS may implement a driving assistance feature such as hill descent based on the map-matching.

Figure 8:
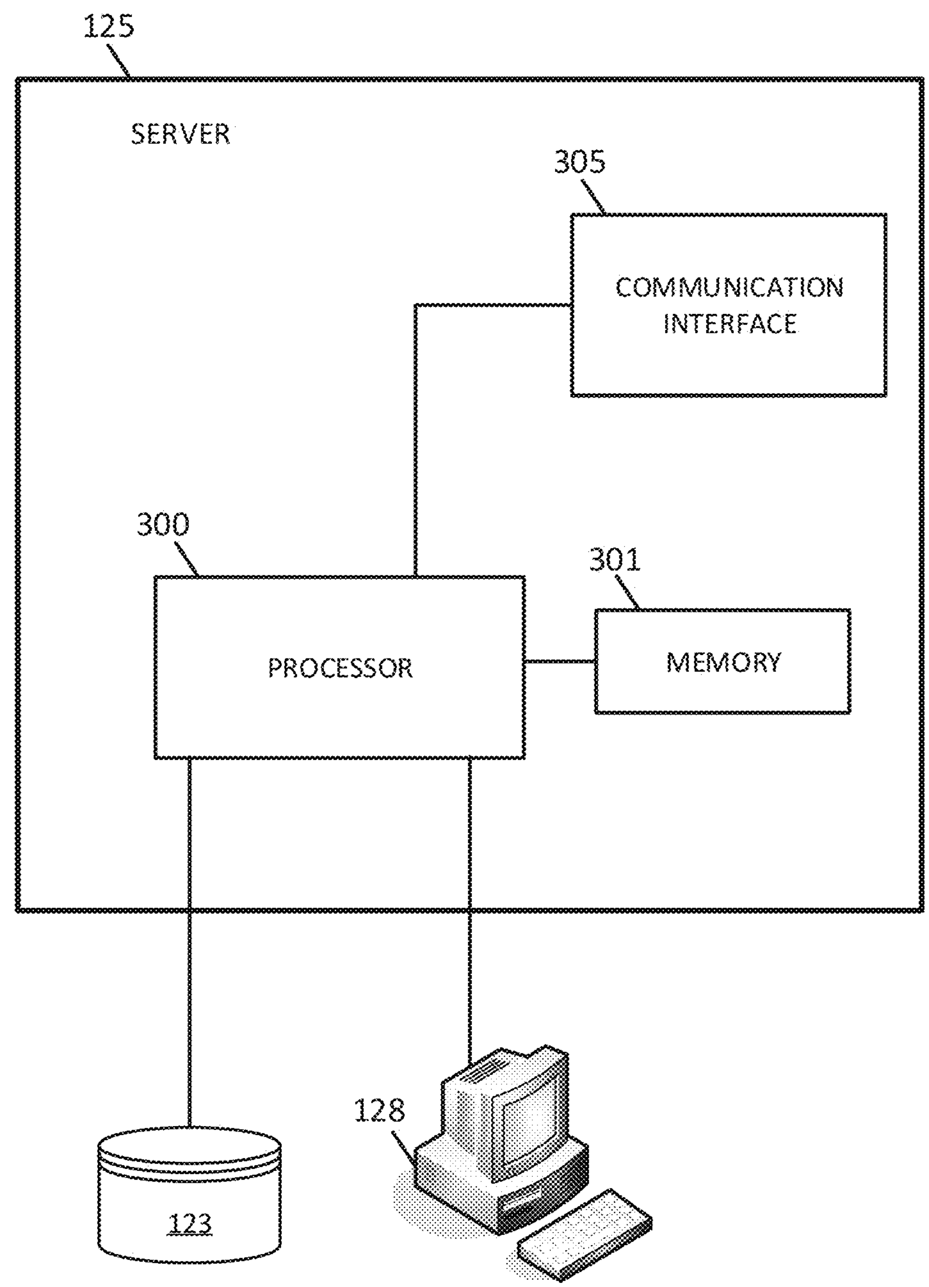
FIG. 8 illustrates an example server.

FIG. 8 illustrates an example server 125, which may apply to the system of FIG. 1. The server 125 includes a processor 300, a communication interface 305, a memory 301, and a database 123. The processor 300 may implement the functions associated with the map-matching controller 121, the pseudonym generator 38, and anonymity calculator 39. The memory 301 may store the map data 31 and the probe data 33. The communication interface 305 may facilitate the receipt of the probe data 33 from the probes 101*a-n* as well as provide the protected probe data 33 to the external device 41. An input device (e.g., keyboard or personal computer 128) may be used to enter settings to the server 125. The settings may include settings for the map-matching. The settings for map matching may include the window size or number of candidate locations for the map-matching. The settings for the map-matching may include the framework for defining the geographic location such as road segments, nodes, or geographic coordinates. Additional, different, or fewer components may be provided in the server 125.

The server 125 may implement the map-matching controller 121 of FIG. 2. For example, the processor 300 may run a program for the map-matching controller 121. In some cases, the server 125 implements modules of the map-matching controller 121. For example, the server or a processor of the server may implement one or more of the receiver 37, the filter 38, the window manager 39, the location generator 40, the probability generator 41, the path calculator 42, and the output 43. In some cases, the server 125 may be configured to receive probe measurements from probes, apply a filter to the measurements, fill a window with the measurements, select an additional measurement from the probe measurements, generate candidate locations for the measurements in the window and for the additional measurement, generate the probability that the candidate locations match the measurements, reduce the number of candidate locations based on probability, generate the transition probabilities between the candidate locations, generate a path between the candidate locations based on the transition probabilities, match an oldest measurement in the window to a candidate location based on the path, and output a path-matched probe measurement.

Figure 9:
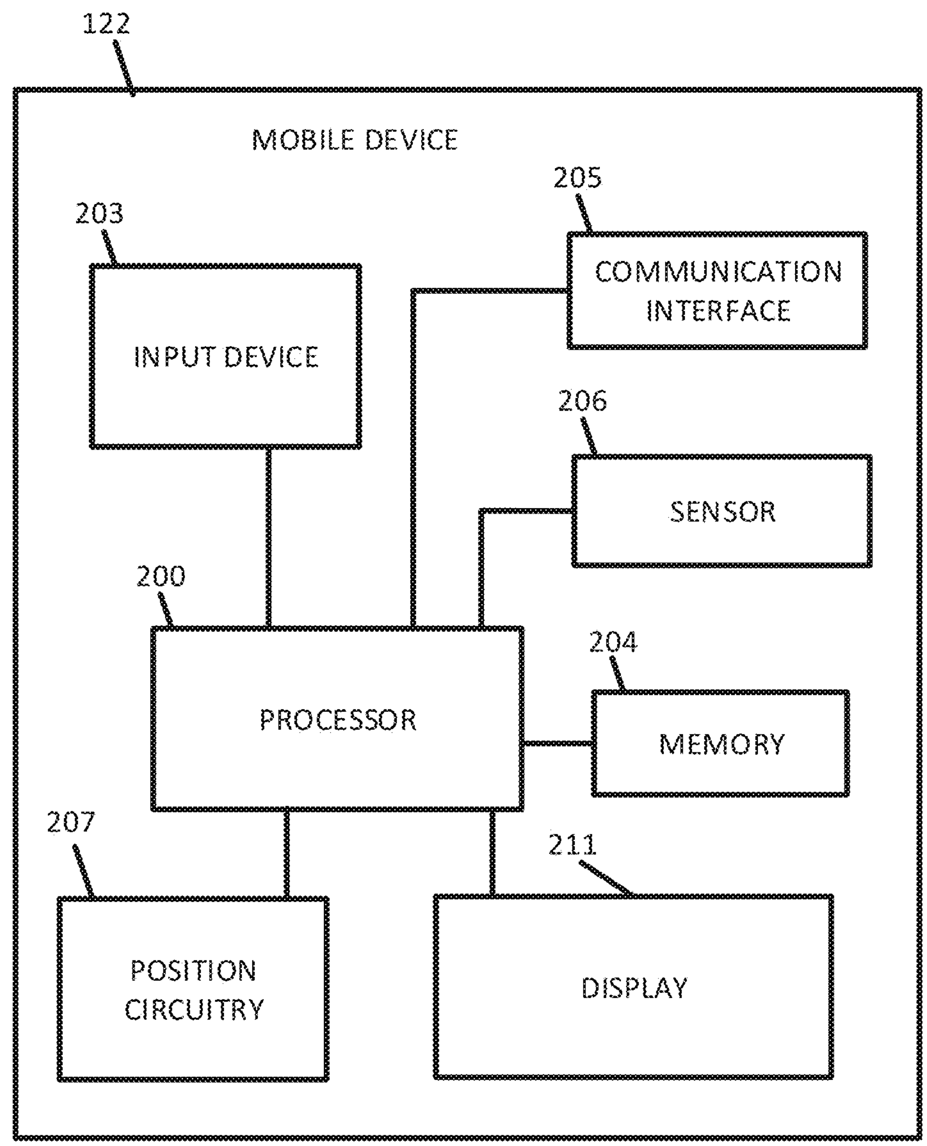
FIG. 9 illustrates an example mobile device.

FIG. 9 illustrates an exemplary mobile device 122 of the system of FIG. 1. The mobile device 122 includes a processor 200, a memory 204, an input device 203, a communication interface 205, position circuitry 207, a distance detector 209, a display 211, and a sensor 206. The input device 203 may receive commands from the user for default settings for the map-matching. The default settings may include the default window size for map-matching. Additionally or alternatively, the input device 203 may receive commands from the user for a location-based service. For example, the user may input a command requesting a service based on the map-matching.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 10:
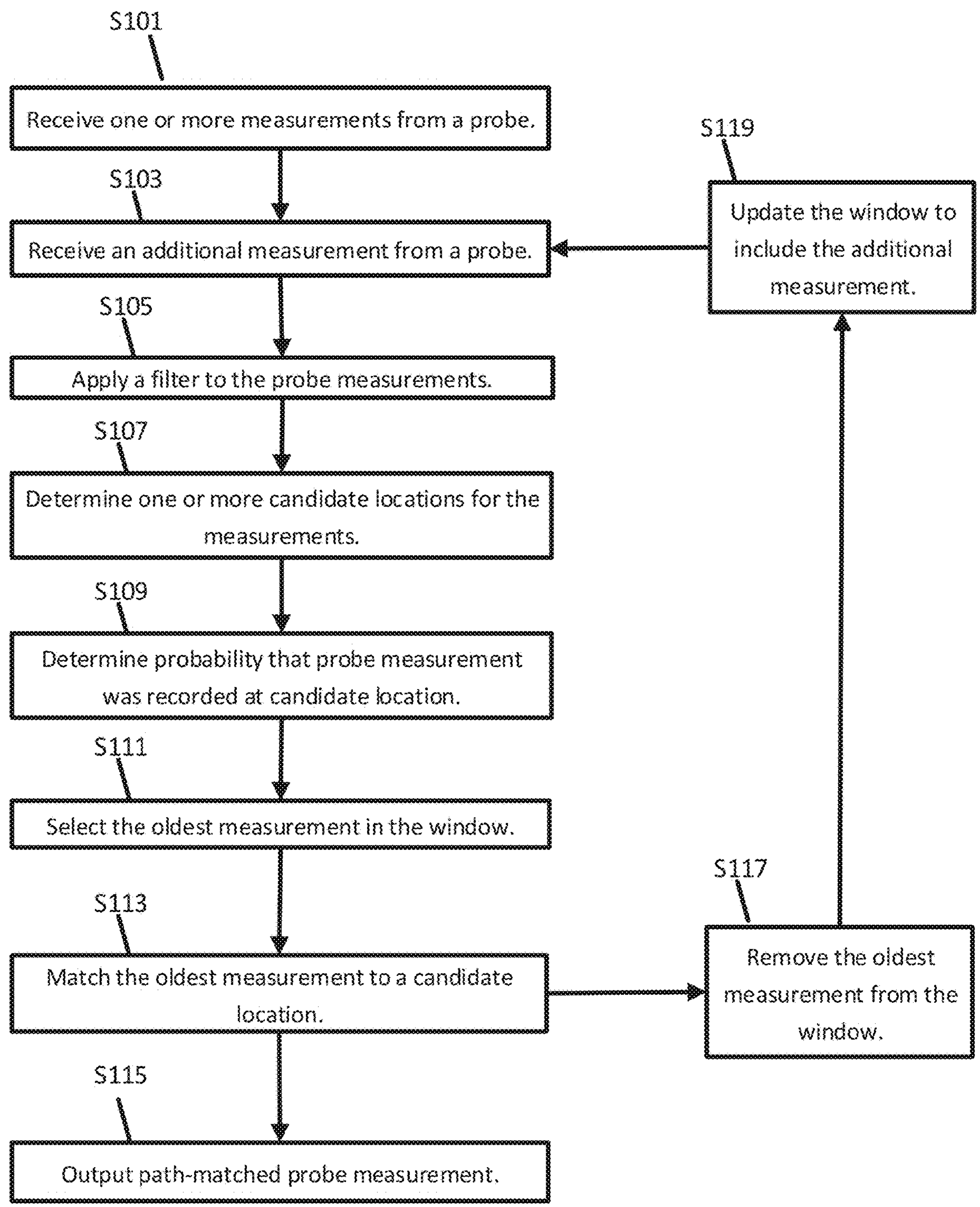
FIG. 10 illustrates an example flowchart for the mobile device of FIG. 12 or the server of FIGS. 1, 2, and 8.

FIG. 10 illustrates an example flowchart for the operation of mobile device 122 or server 125. Additional, different, or fewer acts may be provided. The acts of the flowchart may be performed by a processor of the server or the mobile device. For example, the processor may be running a map-matching controller that performs the acts of the flowchart.

At act S101, the map-matching controller 121 receives one or more measurements from the probe 101. The measurements may be in the form of a stream of probe measurements. In some cases, a receiver 37 of the map-matching controller 121 receives the measurements from the probe 101.

The map-matching controller 121 may continue receiving measurements until a window is filled with probe measurements. For example, where the window dimension is defined such that the window can hold 3 measurements before it is full, the map-matching controller 121 may continue to receive measurements from the probe 101 until the map-matching controller 121 has received 3 measurements. The size of the window may be determined based on a property of the probe, a property of the path, or a property of the geographic location. For example, the size of the window may be based on a heading of the probe, a speed of the probe, or a position of the probe. IN another example, the size of the window is based on a functional class of the path or the path density around the path. In some cases, the size of the window may be set by a window manager 39 of the map-matching controller.

At act S103, the map-matching controller 121 receives an additional measurement from the probe.

At act S105, the map-matching controller 121 applies a filter to the probe measurements. The filter may be a temporal filter where the measurements are filtered based on time. For example, where the map-matching controller receives more than one measurement within a time period, the filter discards any additional measurements. If two measurements are received within 30 seconds, the filter may keep the first measurement and discard the second or discard the first and keep the second measurement. The filter may also be a spatial filter. Where multiple probes are received that are within a distance of one another, the filter may discard additional measurements. For example, where a second measurement is within 15 meters of a first measurement, the filter may keep the first measurement and discard the second measurement or may discard the first measurement and keep the second measurement. In some cases, the filter 38 of the map-matching controller 121 performs the filtering.

At act S107, the map-matching controller 121 determines one or more candidate locations for the measurements in the window and for the additional measurement. The candidate locations are chosen from locations on paths in the geographic area around the probe measurements. For example, the map-matching processor 121 may search an area around the probe measurement for candidate locations. The area may be a circle defined by a radius, for example, of 3 meters. In some cases, the area may be an ellipse. The ellipse may be oriented in the direction of travel of the probes or in the direction of a heading of a probe measurement. The candidate locations may be determined by the location generator 40 of the map-matching controller 121.

The map-matching controller 121 may set an upper limit on the number of candidate locations that are generated for each probe measurement. For example, there may a maximum of 5 candidate locations determined for a probe measurement. In some cases, there is no limit on the number of candidate locations that may be generated for a probe measurement. In other cases, the map-matching controller 121 collects all the possible candidate locations within a set distance of a probe measurement.

At act S109, the map-matching controller 121 determines the probability that the probe measurement was recorded at each candidate location for the probe measurement. For example, candidate locations closer to the location of the probe measurement may be given a higher probability than candidate locations further away from the location of the probe measurement. In another example, candidate locations on paths supporting traffic flow in a direction similar to the heading of the probe measurement may be given a higher probability than candidate locations of paths that do not support traffic flow in the direction of the heading of the probe measurement.

The map-matching controller 121 may reduce the number of candidate locations based on probability. Reducing the number of candidate locations may reduce the computational complexity of map-matching. For example, the map-matching controller may discard candidate locations with a probability of matching the probe measurement that is below a threshold probability. In some cases, the map-matching controller may keep up to a set number of candidate locations for each probe measurement. For example, the map-matching controller may rank the candidate locations for a probe measurement and may keep only the top 3, 5, or another number of candidate locations for that probe measurement. In some cases, the probability generator 41 of the map-matching controller 121 may determine the probabilities of the candidate locations and may reduce the number of candidate locations.

At act S111, the map-matching controller 121 selects the oldest probe measurement in the window for map-matching. By selecting the oldest point for map-matching, the accuracy of the map-matching is ensured because map-matching via the SWMM method accounts for the probe measurements that came after the oldest probe measurement. In some cases, the window manager 39 of the map-matching controller 121 selects the oldest probe measurement from the window.

At act S113, the map-matching controller 121 matches the oldest probe measurement to a candidate location for the oldest probe. The map-matching controller 121 may accomplish the matching by calculating the transition probability between the candidate locations for the measurements in the windows, drawing paths connecting the candidate locations based on the transition probabilities, and selecting a candidate location for the oldest measurement that lies on a path connecting the candidate locations. The transition probability represents the likelihood that the probe traveled from one candidate location for a first measurement to another candidate location for a second probe measurement. The path connecting the candidate locations may be a least-cost path or a most-probable path that is created based on the transition probabilities. For example, a most-probable path may be a path connecting candidate locations for the measurement in the window and the additional measurement while following the highest transition probability between each candidate location. Determining the path may involve running an A* search on the candidate locations. The map-matching controller 121 may match the oldest measurement to the candidate location for the oldest measurement that lies along a path. For example, were one of the candidate locations lies along the least-cost or most-probable path, the map-matching controller may match the oldest measurement to the candidate location on the path. In some cases, the path calculator 42 of the map-matching controller 121 may determine the transition probabilities, the path through the candidate locations, and match the oldest probe measurement.

At act S115, the map-matching controller 121 outputs a map-matched probe measurement. The map-matched probe measurement may be the pair of the probe measurement and the candidate location that was matched to the oldest measurement. In some cases, the output 43 of the map-matching controller 121 may output the map-matched probe measurement based on the oldest measurement.

At act S117, to prepare to iterate on the map-matching process, the map-matching controller 121 may remove the oldest measurement from the window. With the oldest measurement removed, the window now has room to accommodate the additional measurement previously received from the probe in act S103. The map-matching controller 121 may retain the probability that the candidate locations matched with the probe measurements as well as the transition probabilities. In this way, probe measurements and the candidate locations move through the window in a first-in, first-out arrangement. In some cases, the window manager 39 may be configured to remove the oldest measurement from the window.

At act S119, the map-matching controller 121 updates the window to include the additional measurement received from the probe. The map-matching controller 121 may update the window to include the candidate locations associated with the additional measurement. With the window filled again by the addition of the additional measurement to the window, the map-matching processor is ready to accept a second additional measurement from the stream of probe measurements. In some cases, the window manager 39 may be configured to update the window to include the additional measurement.

The map-matching controller 121 may iterate through acts S103-S115 with the updated window to accept a second additional measurement, determine candidate locations for the second additional measurement, determine a matching probability between the candidate locations and the second additional measurement, select a second oldest probe measurement, determine transition probabilities for the updated window and the second additional measurement, create a path linking the candidate locations, match the second oldest measurement to a candidate location on the path, and output a map-matched probe measurement based on the matching. In this way, the map-matching controller 121 may iterate through the entire stream of probe measurements without waiting for all the measurements from the entire trip to be collected, as with other (non-SWMM) approaches to map-matching.

Figure 11:
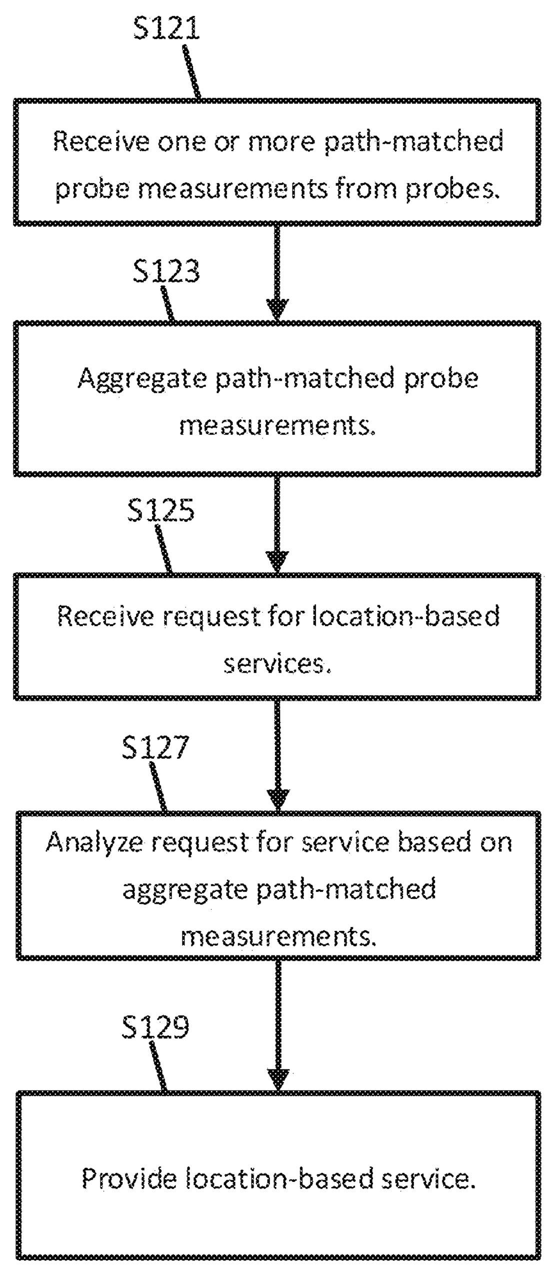
FIG. 11 illustrates an example flowchart for the server of FIGS. 1, 2, and 8.

FIG. 11 illustrates an example flowchart for the server of FIGS. 1, 2, and 8. The server 125 may provide a location-based service based on the outcome of the map-matching process. For example, a SWMM map-matching process may provide the path-matches probe measurement. The acts of FIG. 11 may be run successively after or concurrently with the map-matching acts of FIG. 10.

At act S121, the server 125 receives one or more path-matched probe measurements. A map-matching controller 121 may generate the path-matched probe measurements. For example, the map-matching controller 121 may perform map-matching on the server 125 or on a mobile device 122. The path-matched probe measurements may be generated according to a SWMM or other approach to map-matching.

At act S123, the server 125 aggregates the path-matched probe measurements. The path-matched probe measurements may refer to one or more different probes. For example, the path-matched probe measurements may define a single probe location or a travel path for one or more probes.

At act S125, the server 125 receives a request for a location-based services. The request may be generated by one or more of the mobile devices 122. The location-based services may be a mapping application, a traffic report, or other services. In some cases, the request for location-based services may be triggered by the map-matching process. For example, when a probe measurement is matched to a candidate location, the server may receive a request to add the map-matched probe data to a geographic database. The heading, speed, and location of the probe may be added to the traffic database at the map-matched location.

At act S127, the server analyzes the request for location-based services based on the aggregate path-matched measurements. For example, where the request contains a request for a traffic report at the location of the requestor, the server may analyze what other map-matched data from the aggregate is needed to fulfill the request. The server 125 may need not only the current location of the probe, but also the location and speed of other probes, based on the aggregated path-matched probe measurements, to fulfill the request.

At act S129, the server 125 provides the requested location-based services. For example, where the requestor is a mobile device requesting a traffic report, the server 125 sends the traffic report for the current location of the probe based on the aggregated map-matched probe measurements. Where the request contains a request to update the geographic database, the server 125 may send the aggregated map-matched probe measurement data to the geographic database.

Figure 12:
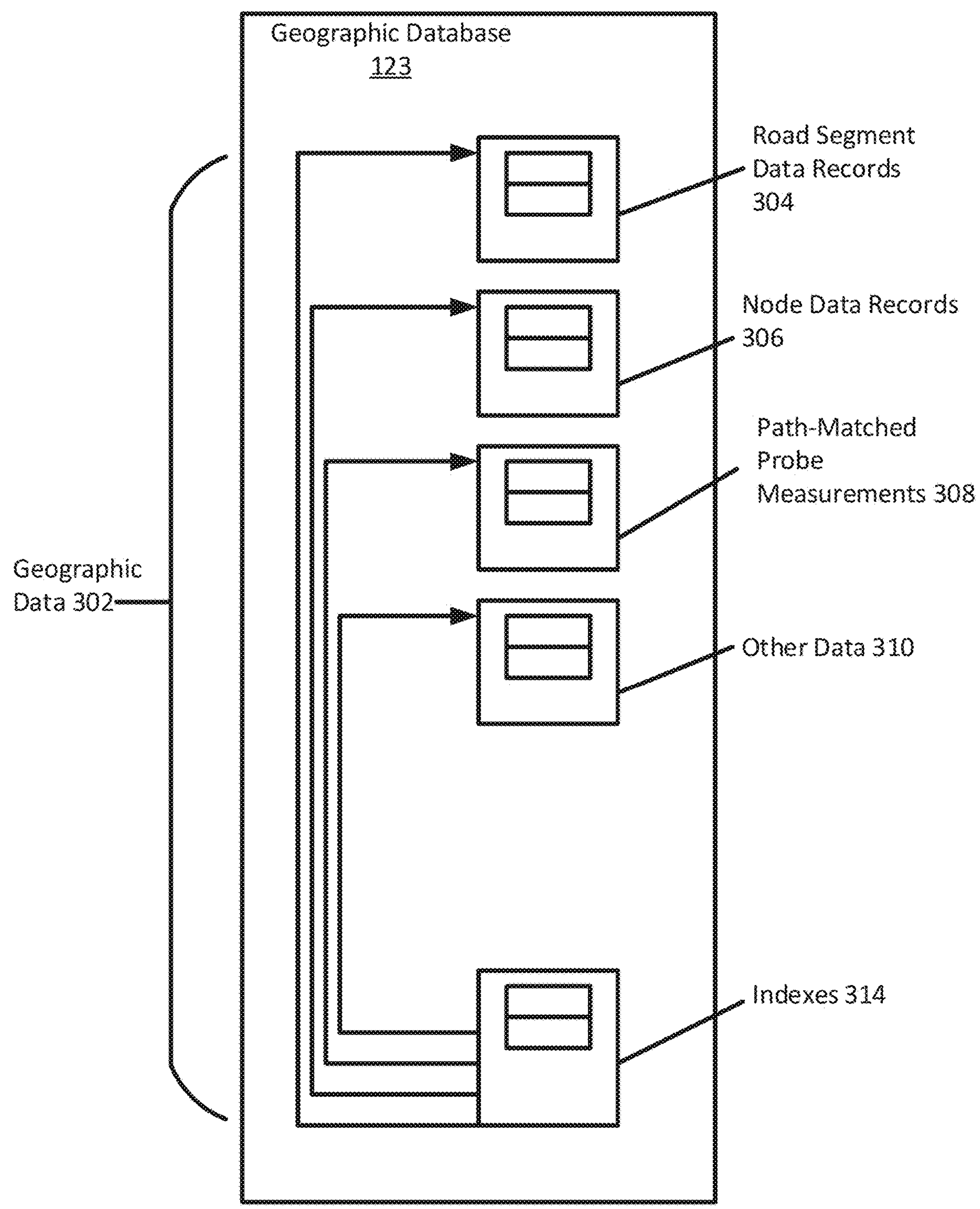
FIGS. 12 and 13 illustrate example geographic databases.

In FIG. 12, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate map-matched probe measurements 308 with a road segment in the segment data records 304 or a geographic coordinate. An index 314 may, for example, store path-matched probe measurement data 308 relating to one or more locations for boundaries of one or more path-matched probe measurement.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 13:
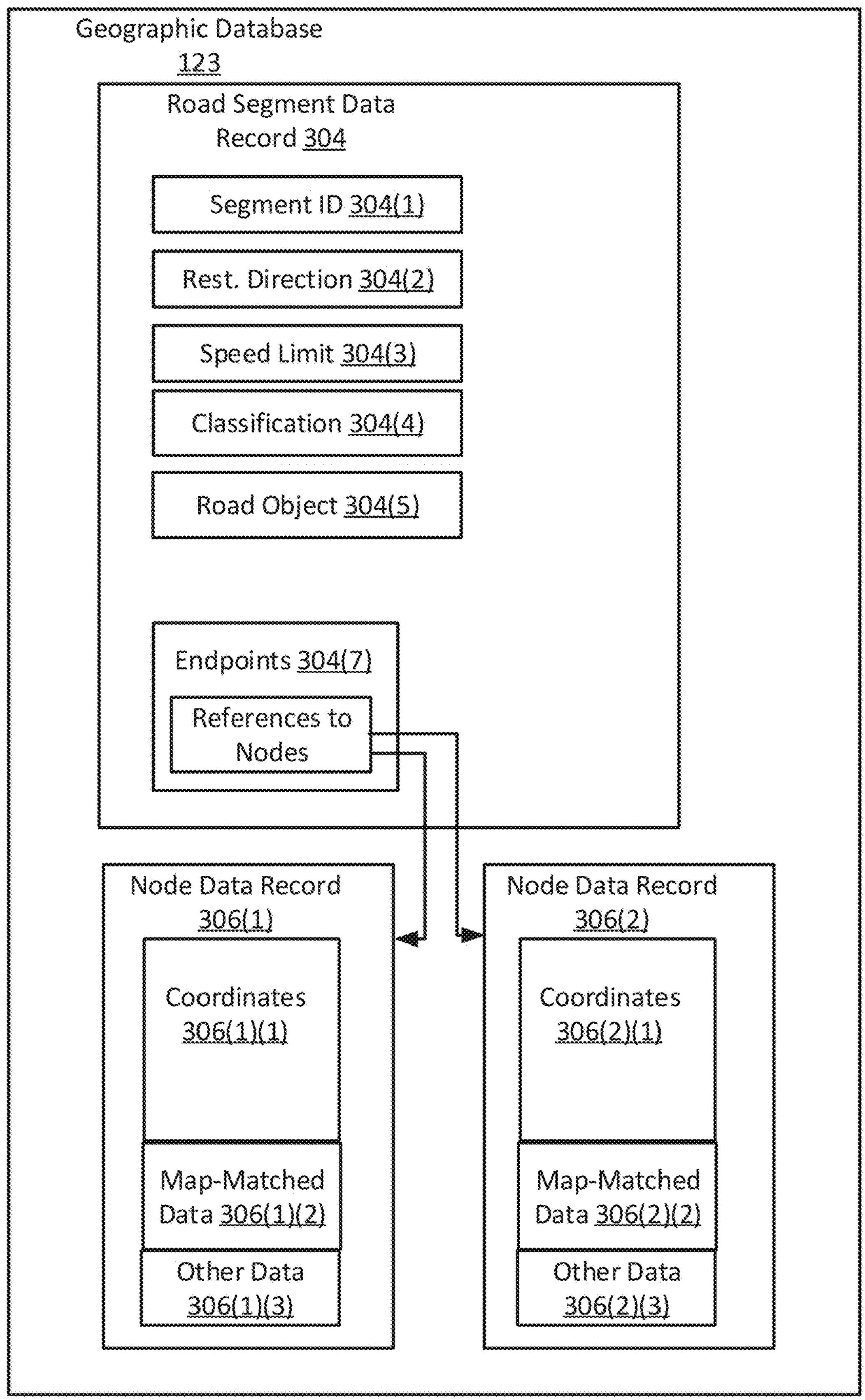

FIG. 13 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 13 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306 (1)(1) and 306(2)(1) for their node, and map-matched data 306 (1)(2) and 306(2)(2). The map-matched data 306 (1)(2) and 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GNSS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method of matching probe measurements to a path in a geographic location, the method comprising:

receiving, by a processor, one or more measurements from a probe for a window;

receiving, by the processor, an additional measurement from the probe;

determining, by the processor, at least one candidate location for the one or more measurements in the window and for the additional measurement;

selecting, by the processor, an oldest measurement from the one or more measurements in the window;

determining, by the processor, a probability that a candidate location corresponds to a measurement for the candidate locations of the one or more measurements in the window and the additional measurement;

removing, by the processor, candidate locations based on a threshold probability;

matching, by the processor, the oldest measurement to a candidate location of the at least one candidate location for the oldest measurement based on the at least one candidate location of the one or more measurements in the window and the at least one candidate location of the additional measurement; and outputting, by the processor, a path-matched probe measurement based on the candidate location matched to the oldest measurement.

Embodiment 2

The method of embodiment 1, further comprising: removing, by the processor, the oldest measurement and the candidate location matched to the oldest measurement from the window;

updating, by the processor, the window to include the additional measurement and the at least one candidate location determined for the additional measurement;

receiving, by the processor, a second additional measurement from the probe;

determining, by the processor, at least one candidate location for the second additional measurement;

selecting, by the processor, a second oldest measurement from the window;

matching, by the processor, the second oldest measurement to a candidate location of the at least one candidate location for the second oldest measurement based on the at least one candidate location of the one or more measurements in the window and the at least one candidate location of the second additional measurement; and outputting, by the processor, a second path-matched probe measurement based on the candidate location matched to the second oldest measurement.

Embodiment 3

The method of any of embodiments 1 and 2, further comprising: determining, by the processor, a transition probability between the candidate locations of the measurements in the window and the additional measurement based on the probability that a candidate location corresponds to a measurement; and determining, by the processor, a most-probable path between the candidate locations of the measurements in the window and the additional measurement based on the transition probabilities, the candidate location matched to the oldest measurement being a part of the most-probable path.

Embodiment 4

The method of any of embodiments 1-3, wherein a number of measurements that fill the window is based on a property of the probe, a property of the path, a property of the geographic location, or combinations thereof.

Embodiment 5

The method of any of embodiments 1-4, wherein the property of the probe is a heading of the probe, a speed of the probe, or a position of the probe.

Embodiment 6

The method of any of embodiments 1-5, wherein the property of the path is a functional class of the path or the path density around the path.

Embodiment 7

The method of any of embodiments 1-6, further comprising: removing, by the processor, candidate locations beyond a maximum number of candidate locations for a measurement.

Embodiment 8

The method of any of embodiments 1-7, further comprising ranking, by the processor, the candidate locations according to the probability, wherein the candidate locations are ordered from lowest probability to highest probability based on the rankings.

Embodiment 9

The method of any of embodiments 1-8, further comprising: applying, by the processor, a temporal filter to the measurements.

Embodiment 10

The method of any of embodiments 1-9, wherein the candidate locations correspond to locations on one or more paths in the geographic location.

Embodiment 11

An apparatus, configured to perform and/or control the method of any of embodiments 1-10 or comprising means for performing and/or controlling any of embodiments 1-10.

Embodiment 12

An apparatus, comprising at least one processor and at least one memory including computer program code for one or more programs, the at least one memory and the computer program code configured to, with the at least one processor, to perform and/or control the method of any of embodiments 1-10.

Embodiment 13

A computer program comprising instructions operable to cause a processor to perform and/or control the method of any of embodiments 1-10, when the computer program is executed on the processor.

We claim:

1. A method of matching probe measurements to a path in a geographic location, the method comprising:

receiving, by a processor, plurality of measurements from a probe for a window, the plurality of measurements including an oldest measurement and a newest measurement;

determining, by the processor, at least one candidate location for the plurality of measurements in the window;

determining, by the processor, that a candidate location corresponds to a measurement for the candidate locations of the plurality of measurements in the window;

matching, by the processor, the oldest measurement to a candidate location of the at least one candidate location for the oldest measurement based on the at least one candidate location of the plurality of measurements in the window; and outputting, by the processor, a path-matched probe measurement based on the candidate location matched to the oldest measurement.

2. The method of claim 1, further comprising:

receiving, by the processor, an additional measurement from the probe;

determining, by the processor, at least one candidate location for the additional measurement;

matching, by the processor, a second oldest measurement of the plurality of measurements to a candidate location of the at least one candidate location for the second oldest measurement based on the at least one candidate location of the plurality of measurements in the window and the at least one candidate location of the additional measurement; and outputting, by the processor, a second path-matched probe measurement based on the candidate location matched to the second oldest measurement.

3. The method of claim 1, further comprising:

determining, by the processor, a transition probability between the candidate locations of the measurements in the window and the newest measurement based on a correspondence between the candidate locations and the measurements; and determining, by the processor, a path between the candidate locations of the measurements in the window based on the transition probabilities, the candidate location matched to the oldest measurement being a part of the path.

4. The method of claim 1, wherein a number of measurements that fill the window is based on a property of the probe, a property of the path, a property of the geographic location, or combinations thereof.

5. The method of claim 4, wherein the property of the probe is a heading of the probe, a speed of the probe, or a position of the probe.

6. The method of claim 4, wherein the property of the path is a functional class of the path or a path density around the path.

7. The method of claim 1, further comprising:

removing, by the processor, candidate locations beyond a maximum number of candidate locations for a measurement.

8. The method of claim 1, further comprising:

applying, by the processor, a temporal filter to the plurality of measurements.

9. The method of claim 8, wherein one or more measurements of the plurality of measurements are removed from the window based on the temporal filter being applied.

10. The method of claim 1, wherein the candidate locations correspond to locations on one or more paths in the geographic location.

11. An apparatus for matching probe measurements to a path in a geographic location, the apparatus comprising:

a receiver configured to receive a stream of measurements from the probe;

a window manager configured to fill a window with plurality of measurements from the stream of measurements, the stream including a newest measurement and an oldest measurement;

a location generator configured to determine at least one candidate location for the measurements in the window;

a path calculator configured to match the oldest measurement to a candidate location of the at least one candidate location for the oldest measurement based on the at least one candidate location of the plurality of measurements in the window; and an output configured to output a path-matched probe measurement based on the candidate location matched to the oldest measurement.

12. The apparatus of claim 11, wherein the window includes a second oldest measurement of the plurality of measurements, wherein the location generator is further configured to determine at least one candidate location for an additional measurement of the stream, wherein the path calculator is configured to match the second oldest measurement to a candidate location of the at least one candidate location for the second oldest measurement based on the at least one candidate location of the plurality of measurements in the window and the at least one candidate location of the additional measurement, and wherein the output is further configured to output a second path-matched probe measurement based on the candidate location matched to the second oldest measurement.

13. The apparatus of claim 11, further comprising:

a probability generator configured to determine that a candidate location corresponds to a measurement for the candidate locations of the measurements in the window and to determine a transition probability between the candidate locations of the measurements in the window and the newest measurement based on a correspondence between a candidate location and a measurement, wherein the path calculator is further configured to determine a path between the candidate locations of the measurements in the window and the newest measurement based on the transition probabilities, the candidate location matched to the oldest measurement being a part of the path.

14. The apparatus of claim 11, wherein a number of measurements that fill the window is based on a property of the probe, a property of the path, a property of the geographic location, or combinations thereof.

15. The apparatus of claim 14, wherein the property of the probe is a heading, speed, or position of the probe.

16. The apparatus of claim 14, wherein the property of the path is a functional class of the path or a path density around the path.

17. The apparatus of claim 11, further comprising:

a probability generator configured to determine that a candidate location corresponds to a measurement for the candidate locations of the measurements in the window, wherein the location generator is further configured to rank the candidate locations according to the probability.

18. The apparatus of claim 11, further comprising:

a filter configured to apply a temporal filter to the stream of measurements.

19. The apparatus of claim 11, wherein the candidate locations correspond to locations on one or more paths in the geographic location.

20. A non-transitory computer-readable medium including instructions that when executed are operable to:

receive a plurality of measurements from the probe to fill a window, the plurality of measurements including an oldest measurement;

determine at least one candidate location for measurements in the plurality of measurements in the window;

match the oldest measurement to a candidate location of the at least one candidate location for the oldest measurement based on the at least one candidate location of the plurality of measurements in the window; and output a path-matched probe measurement based on the candidate location matched to the oldest measurement.

* * * * *